(12) United States Patent
Oto

(10) Patent No.: US 8,107,351 B2
(45) Date of Patent: Jan. 31, 2012

(54) LAMINATED HALF-WAVE PLATE, OPTICAL PICKUP DEVICE, POLARIZATION CONVERTER, AND PROJECTION DISPLAY APPARATUS

(75) Inventor: Masayuki Oto, Zama (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/727,562

(22) Filed: Mar. 19, 2010

(65) Prior Publication Data

US 2010/0246368 A1 Sep. 30, 2010

(30) Foreign Application Priority Data

Mar. 30, 2009 (JP) ................................. 2009-081230

(51) Int. Cl.
*G11B 7/135* (2006.01)
*G11B 7/00* (2006.01)
*G02B 5/30* (2006.01)
*G03B 21/14* (2006.01)

(52) U.S. Cl. ......... 369/112.27; 369/112.23; 369/112.09; 369/112.14; 369/112.21; 359/485.01; 353/20

(58) Field of Classification Search ............. 369/112.23, 369/112.09, 112.14, 112.21, 112.27; 359/485, 359/497; 353/20
See application file for complete search history.

(56) References Cited

U.S. PATENT DOCUMENTS

| 6,025,958 A | 2/2000 | Yamaoka et al. |
| 6,095,653 A * | 8/2000 | Yajima ............................. 353/33 |
| 2005/0180296 A1 * | 8/2005 | Ooto ........................ 369/112.22 |
| 2007/0003775 A1 | 1/2007 | Ushino et al. |
| 2007/0291357 A1 * | 12/2007 | Oto ............................... 359/485 |
| 2008/0180799 A1 * | 7/2008 | Ooto .............................. 359/483 |
| 2008/0239487 A1 | 10/2008 | Kobayashi et al. |
| 2008/0310285 A1 | 12/2008 | Oto |

FOREIGN PATENT DOCUMENTS

| JP | 08-007322 | 1/1996 |
| JP | 2519198 | 5/1996 |
| JP | 11-149015 | 6/1999 |
| JP | 3174367 | 3/2001 |
| JP | 2004-038025 | 2/2004 |
| JP | 2004-070299 | 3/2004 |
| JP | 2004-170853 | 6/2004 |
| JP | 2004-264620 | 9/2004 |
| JP | 2007-206225 | 8/2007 |
| JP | 2007-304572 | 11/2007 |
| JP | 4103469 | 4/2008 |
| JP | 2008-268901 | 11/2008 |
| JP | 4277514 | 3/2009 |
| WO | 2007-046241 | 4/2007 |

* cited by examiner

*Primary Examiner* — Mohammad Ghayour
*Assistant Examiner* — Aneeta Yodichkas
(74) *Attorney, Agent, or Firm* — Harness, Dickey & Pierce, P.L.C.

(57) ABSTRACT

A laminated half-wave plate includes: first and second wave plates having optical axes intersecting each other, wherein when phase differences of the first and second wave plates with respect to a wavelength $\lambda$ are represented by $\Gamma_1$ and $\Gamma_2$, in-plane bearing angles formed by a polarization plane of a linearly-polarized beam incident on the laminated half-wave plate and the optical axes of the first and second wave plates are represented by $\theta_1$ and $\theta_2$, an angle formed by the polarization directions of the linearly-polarized beams incident on and emitted from the laminated half-wave plate is represented by $\phi$, and an optical axis adjustment amount is represented by a, the following expressions are satisfied: $\Gamma_1=180°+n\times360°$; $\Gamma_2=180°+n\times360°$ (where n in $\Gamma_1$ and $\Gamma_2$ is a non-negative integer); $\theta_1=\phi/4+a$; and $\theta_2=3\phi/4-a$.

16 Claims, 15 Drawing Sheets

LAMINATED HALF-WAVE PLATE, OPTICAL PICKUP DEVICE, POLARIZATION CONVERTER, AND PROJECTION DISPLAY APPARATUS

BACKGROUND

1. Technical Field

The present invention relates to a laminated half-wave plate in which two wave plates formed of an inorganic crystalline material such as quartz crystal having birefringence properties are arranged to overlap with each other, and an optical pickup device, a polarization converter, and a projection display apparatus which employ the laminated half-wave plate.

2. Related Art

A half-wave plate emitting as an output beam a linearly-polarized beam obtained by rotating a polarization plane of a linearly-polarized beam of an incident beam by a predetermined angle, for example, 90°, has been employed in optical devices such as an optical pickup device used for recording on and reproduction from an optical disk device, a polarization converter, and a projection display apparatus such as a liquid crystal projector. As for the half-wave plate, various laminated structures have been suggested in which two wave plates are bonded so that their optical axes intersect.

In general, a half-wave plate has wavelength dependence where phase difference varies with a variation in wavelength, and the phase difference increases or decreases in wavelength bands in the vicinity of a target wavelength. In the half-wave plate used in a polarization converter of a liquid crystal projector, it is required that the phase difference of 180° is kept in a broad wavelength range of 400 to 700 nm. Therefore, a laminated wave plate is known (for example, JP-A-2004-170853) where the whole of which serves as a half-wave plate in the above-mentioned broad wavelength range and is formed by bonding a first wave plate with an optical axis bearing angle $\theta_1$ and a second wave plate with an optical axis bearing angle $\theta_2$ so that the optical axes thereof intersect each other and satisfy the relations of $\theta_2=\theta_1+45°$ and $0<\theta_1<45°$.

In a liquid crystal projector or an optical pickup device, since a beam diverges and is incident on the half-wave plate, there is a problem with the incident angle dependence that the phase difference varies in regions other than the vicinity of the center of the wave plate. Accordingly, a polarization conversion efficiency of a half-wave plate, that is, a ratio at which the incident linearly-polarized beam of P polarization is converted into a linearly-polarized beam of S polarization and the resultant beam is output, is lowered, thereby causing a loss of light intensity. Therefore, a high-order-mode laminated wave plate is known where the whole of which serves as a half-wave plate in which a first wave plate with a phase difference of $\Gamma_1=180°+360°\times n$ (where n is a positive integer) and a second wave plate with a phase difference of $\Gamma_2=180°+360°\times n$ are bonded so that the optical axes thereof intersect each other and $\theta_2=\theta_1+\theta/2$ is satisfied, where in-plane bearing angles of the first and second wave plates are represented by $\theta_1$ and $\theta_2$ and an angle formed by the polarization direction of the linearly-polarized beam incident on the laminated wave plate and the polarization direction of the linearly-polarized beam output therefrom is represented by $\theta$ (For example, JP-A-2007-304572).

In JP-A-2007-304572, by appropriately setting n of the first and second wave plates of the laminated wave plate, the thickness can be set to a size which can be easily machined. By setting n=5, $\theta_1=22.5°$, and $\theta_2=67.5°$ in the laminated wave plate, the wavelength conversion efficiency can be set to almost 1 in the wavelength bands 405 nm, 660 nm, and 785 nm required for the three-band optical pickup wave plate for three primary colors of red, blue, and green light, thereby suppressing the loss in light intensity.

Similarly, to improve the polarization conversion efficiency, a laminated wave plate is suggested which serves as a half-wave plate in which a first wave plate with a phase difference $\Gamma_a=180°$ and a second wave plate with a phase difference $\Gamma_b=180°$ are bonded, the optical axis bearing angles $\theta_a$ and $\theta_b$ of the first and second wave plates satisfy $\theta_b=\theta_a+\alpha$, $0<\theta_a<45°$, and $40°<\alpha<50°$, and a difference $\Delta\Gamma_a$ of the phase difference $\Gamma_a$ from a designed target value and a difference $\Delta\Gamma_b$ of the phase difference $\Gamma_b$ from a designed target value satisfy a predetermined relational expression (see JP-A-2008-268901). In this laminated wave plate, by canceling the difference $\Delta\Gamma_a$ of the phase difference $\Gamma_a$ from the designed target value with the difference $\Delta\Gamma_b$ of the phase difference $\Gamma_b$ from the designed target value on the basis of the predetermined relational expression, it is possible to obtain a high polarization conversion efficiency.

FIGS. 16A and 16B are diagrams illustrating a typical example of the above-mentioned laminated half-wave plate according to the related art. The laminated half-wave plate 1 includes first and second wave plates 2 and 3 which are formed of an optical uniaxial crystalline material such as a quartz crystal substrate and which are arranged sequentially from the light incidence side Li to the light output side Lo. The first and second wave plates are bonded so that crystal optical axes 4 and 5 thereof intersect each other at a predetermined angle. At this time, the phase difference of the first wave plate 2 is $\Gamma_1=180°+n_1\times360°$ (where $n_1$ is a non-negative integer) and the phase difference of the second wave plate 3 is $\Gamma_2=180°+n_2\times360°$ (where $n_2$ is a non-negative integer). The optical axis bearing angle $\theta_1$ of the first wave plate 2 is an angle formed by the crystal optical axis 4 and the polarization plane of the linearly-polarized beam 6 incident on the laminated half-wave plate 1 and the optical axis bearing angle $\theta_2$ of the second wave plate 3 is an angle formed by the crystal optical axis 5 and the polarization plane of the linearly-polarized beam.

In the laminated half-wave plate 1 shown in FIGS. 16A and 16B, the angle formed by the polarization direction of the incident linearly-polarized beam 6 and the polarization direction of the output linearly-polarized beam 7 is set to 90°. The polarization state of the laminated half-wave plate 1 is described now using a Poincare sphere shown in FIGS. 17A to 17C. FIG. 17A is a diagram illustrating a trajectory transition in the Poincare sphere of the linearly-polarized beam incident on the laminated half-wave plate 1. A position in the equatorial line at which the linearly-polarized beam 4 is incident is set to an intersection point $P_0$ with an axis S1. FIG. 17B is a view illustrating the locus of the polarization state of a beam incident on the laminated half-wave plate 1 as viewed from an axis S2 in the Poincare sphere shown in FIG. 17A, that is, a projected diagram onto the plane S1S3. FIG. 17C is a view illustrating the locus of the polarization state of a beam incident on the laminated half-wave plate 1 as viewed from an axis S3 in the Poincare sphere shown in FIG. 17A, that is, a projected diagram onto the plane S1S2.

The reference point of the incident beam is set to a point $P_0=(1,0,0)$ in the axis S1, the rotation axis $R_1$ of the first wave plate 2 is set to a position which is rotated from the axis S1 by $2\theta_1$, and the rotation axis $R_2$ of the second wave plate 3 is set to a position which is rotated from the axis S1 by $2\theta_2$. When the reference point $P_0$ is rotated about the rotation axis $R_1$ to the right side by the phase difference $\Gamma_1$, the point $P_1=(0,1,0)$ in the equatorial line of the Poincare sphere is the position of the output beam of the first wave plate 2. When the point $P_1$ is rotated about the rotation axis $R_2$ to the right side by the phase difference $\Gamma_2$, the point $P_2=(-1, 0, 0)$ in the equatorial line of the Poincare sphere is the position of the output beam of the second wave plate 3, that is, the position of the output beam of the laminated half-wave plate 1. As long as the wavelength of the incident beam Lo does not depart from the target value, the position of the output beam is located in the equatorial line of the Poincare sphere.

However, an optical pickup device mounted on a blu-ray optical disk recording and reproducing apparatus employs a short-wavelength (405 nm) violet-blue laser. When it expands due to the high temperature when being used, a problem is caused in that the wavelength of an oscillated laser drifts. Accordingly, in the optical pickup device, the half-wave plate causes a problem that the conversion efficiency of the linearly-polarized beam is deteriorated due to the wavelength drift of the incident laser beam. Particularly, when the half-wave plate is in a high-order mode described in JP-A-2007-304572, the thickness is great and thus the variation increases with an increase in phase difference, thereby further deteriorating the conversion efficiency.

JP-A-2004-170853 discloses a method for preventing or reducing the influence of the variation in wavelength. In this method, when the differences of the phase differences of the first and second wave plates due to the variation in wavelength are $\Delta\Gamma_1$ and $\Delta\Gamma_2$, the differences of the phase differences can be canceled by setting $\Delta\Gamma_1=\Delta\Gamma_2$. Accordingly, the position $P_2$ of the output beam in the Poincare sphere is always located in the equatorial line.

This will be described using the Poincare sphere shown in FIGS. 17A to 17C. The position of the output beam of the first wave plate 2 is the point $P_1'$ which is rotated about the rotation axis $R_1$ from the point $P_1$ to the right side by the difference $\Delta\Gamma_1$. The position of the output beam of the second wave plate 3 is the point $P_2'$ in the equatorial line of the Poincare sphere which is rotated about the rotation axis $R_2$ from the point $P_1'$ to the right side by the difference $\Gamma_2+\Delta\Gamma_2$. The point $P_2'$ is the position of the output beam from the laminated half-wave plate 1. As can be seen from the drawings, since the point $P_2'$ is deviated from the point $P_2$ in the equatorial line, the rotation of the polarization plane of the output beam is deviated from 90°.

In JP-A-2004-170853, the rotational deviation of the polarization plane of the output beam can decrease as $\Delta\Gamma_1$ and $\Delta\Gamma_2$ decrease. Accordingly, it is preferable that the first and second wave plates 2 and 3 are formed of a single-mode wave plate and the wavelength dependency is reduced as much as possible. The single-mode wave plate with a phase difference of 180° is excellent in terms of incident angle dependency, which is desirable. However, when the wave plate is formed particularly of a quartz crystal plate with a cutting angle of 90° Z, that is, with an angle of 90° formed by a normal direction of main surface of the quartz crystal substrate and the quartz crystal optical axis (Z axis), the thickness decreases up to 20 μm and thus it is difficult to manufacture the wave plate.

JP-A-2008-268901 discloses a problem that the position of the output beam of the first wave plate in the Poincare sphere is deviated when the thickness processing accuracy of the first wave plate deviates from the designed value. To solve this problem, JP-A-2008-268901 discloses a method of processing the thickness of the second wave plate so as to cancel the deviation of the position of the output beam of the first wave plate. However, in the laminated wave plate disclosed in JP-A-2008-268901, since the first and second wave plates are also the single-mode wave plates formed of a quartz crystal plate with a cutting angle of 90° Z, it is difficult to manufacture the wave plate.

On the other hand, in the laminated half-wave plate disclosed in JP-A-2007-304572, since the first and second wave plates are in a high-order mode, there are no problems in terms of manufacturing difficulties. However, when the order n of the high-order mode of the first and second wave plates is too great, the wavelength band width in which the conversion efficiency is close to 1 is reduced and thus there is a problem in terms of difficulties with its use as the laminated half-wave plate.

Here, the conversion efficiency is an estimated value used to accurately determine the polarization state of the output beam of the laminated half-wave plate including two wave plates bonded to each other, as described in JP-A-2007-304572, and is obtained by calculating the light intensity of the output beam with respect to the incident beam by a predetermined calculation technique. This method is simply described below.

In the laminated half-wave plate 1, when the Muller matrix of the first wave plate 2 is represented by $R_1$, the Muller matrix of the second wave plate 3 is represented by $R_2$, the polarization state of the incident beam is represented by vector I, and the polarization state of the output beam is represented by vector E, the polarization state of the beam having passed through the laminated half-wave plate 1 can be expressed by the following expression.

$$E = R_2 \cdot R_1 \cdot I \qquad \text{Expression 1}$$

Here, $R_1$ and $R_2$ are expressed by the following expressions.

$$R_1 = \begin{bmatrix} 1 & 0 & 0 & 0 \\ 0 & 1-(1-\cos\Gamma_1)\sin^2 2\theta_1 & (1-\cos\Gamma_1)\sin 2\theta_1 \cos 2\theta_1 & -\sin\Gamma_1 \sin 2\theta_1 \\ 0 & (1-\cos\Gamma_1)\sin 2\theta_1 \cos 2\theta_1 & 1-(1-\cos\Gamma_1)\sin^2 2\theta_1) & \sin\Gamma_1 \cos 2\theta_1 \\ 0 & \sin\Gamma_1 \sin 2\theta_1 & -\sin\Gamma_1 \cos 2\theta_1 & \cos\Gamma_1 \end{bmatrix} \qquad \text{Expression 2}$$

$$R_2 = \begin{bmatrix} 1 & 0 & 0 & 0 \\ 0 & 1-(1-\cos\Gamma_2)\sin^2 2\theta_2 & (1-\cos\Gamma_2)\sin 2\theta_2 \cos 2\theta_2 & -\sin\Gamma_2 \sin 2\theta_2 \\ 0 & (1-\cos\Gamma_2)\sin 2\theta_2 \cos 2\theta_2 & 1-(1-\cos\Gamma_2)\sin^2 2\theta_2) & \sin\Gamma_2 \cos 2\theta_2 \\ 0 & \sin\Gamma_2 \sin 2\theta_2 & -\sin\Gamma_2 \cos 2\theta_2 & \cos\Gamma_2 \end{bmatrix} \qquad \text{Expression 3}$$

When the order n of the high-order mode of the first and second wave plates 2 and 3, the phase differences $\Gamma_1$ and $\Gamma_2$, and the optical axis bearing angles $\theta_1$ and $\theta_2$ are set, the Muller matrixes $R_1$ and $R_2$ are calculated by using Expressions 2 and 3, and the polarization state I of the incident beam is set, the polarization state E of the output beam is calculated by using Expression 1. The polarization state E of the output beam is called a Stokes vector and is expressed by the following expression.

$$E = \begin{bmatrix} S_{01} \\ S_{11} \\ S_{21} \\ S_{31} \end{bmatrix}$$

Expression 4

Here, the E matrix elements $S_{01}$, $S_{11}$, $S_{21}$, and $S_{31}$ are called Stokes parameters and indicate the polarization state. When the transmission axis of a matrix P of a polarizer is set to a predetermined angle and the product of the matrix E indicating the polarization state E of the output beam and the matrix P of the polarizer is T, T is expressed by the following expression.

$$T = P \cdot E$$

Expression 5

The matrix T indicates the conversion efficiency and can be expressed by the following expression using the Stokes parameters of the elements.

$$T = \begin{bmatrix} S_{02} \\ S_{12} \\ S_{22} \\ S_{32} \end{bmatrix}$$

Expression 6

Here, when the Stokes parameter $S_{02}$ of the vector T represents the light intensity and the incident light intensity is set to 1, the Stokes parameter $S_{02}$ is the conversion efficiency. Accordingly, the conversion efficiency T of the laminated half-wave plate 1 can be simulated while variously changing the order n of the high-order mode of the first and second wave plates 2 and 3, the phase differences $\Gamma_1$ and $\Gamma_2$ at a predetermined wavelength (for example, at a wavelength of 405 nm), and the optical axis bearing angles $\theta_1$ and $\theta_2$.

FIG. 18 shows the simulation result of the variation in conversion efficiency T with respect to the wavelength of the incident beam when the target wavelength $\lambda_0$, which is used in the laminated half-wave plate 1 according to the related art shown in FIGS. 16A and 16B, is 405 nm. In the drawing, it can be seen that the conversion efficiency in the related art is almost 1 in the vicinity of $\lambda_0$=405 nm, but deteriorates as the wavelength gets farther from the target value. When the laminated half-wave plate is used in the optical pickup device, the conversion efficiency of the linearly-polarized beam may deteriorate due to the wavelength drift of the incident laser beam.

SUMMARY

An advantage of some aspects of the invention is that it provides a laminated half-wave plate including first and second wave plates overlapping with each other so that optical axes thereof intersect each other, which can suppress as much as possible the decrease in conversion efficiency in a wavelength range with a broader bandwidth and realize an excellent conversion efficiency as needed.

Another advantage of some aspects of the invention is that it provides an optical pickup device, a polarization converter, and an optical apparatus such as a projection display apparatus, which can exhibit stable and excellent performance in a wavelength range with a broader bandwidth by suppressing the influence of the variation in wavelength due to wavelength drift using the laminated half-wave plate.

As a result of various studies on the relationship between the variation wavelength and the conversion efficiency, the inventor found out that by reducing the difference between the optical axis bearing angles $\theta_1$ and $\theta_2$ of the first and second wave plates and setting the rotation axis $R_1$ and the rotation axis $R_2$ in the Poincare sphere to be close to each other, it is possible to suppress the deterioration in conversion efficiency in the wavelength range with a broader bandwidth. Accordingly, the conversion efficiency of the laminated half-wave plate 1 shown in FIGS. 16A and 16B was simulated using the above-mentioned calculation method while changing the optical axis bearing angles of the first and second wave plates from $\theta_1$=22.5° and $\theta_2$=67.5° to the ranges of 22.5°<$\theta_1$<45.0° and 45.0°<$\theta_2$<67.5°.

As a result, it was found that the conversion efficiency deteriorates less in the vicinity of the target value $\lambda_0$=405 nm than that in the related art, but the wavelength position with the conversion efficiency of T=1 exists in both sides thereof, and the whole of which can obtain the excellent conversion efficiency in a broader wavelength range. The invention is made on the basis of this knowledge.

According to an aspect of the invention, there is provided a laminated half-wave plate including a first wave plate and a second wave plate, in which the first wave plate and the second wave plate are arranged so that optical axes thereof intersect each other. Here, when phase differences of the first wave plate and the second wave plate with respect to a wavelength $\lambda$, are represented by $\Gamma_1$ and $\Gamma_2$, in-plane bearing angles formed by a polarization plane of a linearly-polarized beam incident on the laminated half-wave plate and optical axes of the first and second wave plates are represented by $\theta_1$ and $\theta_2$, an angle formed by a polarization direction of the linearly-polarized beam incident on the laminated half-wave plate and a polarization direction of the linearly-polarized beam emitted from the laminated half-wave plate is represented by $\phi$, and an optical axis adjustment amount is represented by a, the following expressions are satisfied:

$\Gamma_1 = 180° + n \times 360°$;

$\Gamma_2 = 180° + n \times 360°$;

$\theta_1 = \phi/4 + a$; and $\theta_2 = 3\phi/4 - a$.

Here, n in $\Gamma_1$ and $\Gamma_2$ is a non-negative integer.

According to this configuration, by reducing the difference between the in-plane bearing angles $\theta_1$ and $\theta_2$ of the optical axes of the first and second wave plates, it is possible to suppress as much as possible the deterioration in conversion efficiency in the wavelength range with a broader bandwidth, thereby obtaining an excellent conversion efficiency as needed. Accordingly, it is possible to achieve a laminated half-wave plate which is stable with the variation in wavelength of the incident light and which has a very high use efficiency of light.

In the laminated half-wave plate, the angle $\phi$ may satisfy 15°≦$\phi$≦90°.

In the laminated half-wave plate, n=1 may be set in the phase differences $\Gamma_1$ and $\Gamma_2$ of the first and second wave plates. Here, the optical axis adjustment amount a is set so that 0°<a<$a_{max}$, and the maximum value $a_{max}$ of the optical axis adjustment amount is determined by the following expressions:

$a_{max} = A_0 + A_1 \cdot \phi + A_2 \cdot \phi^2$;

$A_0 = -0.06032$;

$A_1=0.0717$; and $A_2=-0.00035$.

Accordingly, it is possible to set the wave plates to a thickness which can be processed in manufacturing. By setting the angle φ, it is possible to simply design the laminated half-wave plate which can provide an excellent conversion efficiency in a broader band.

In the laminated half-wave plate, n=2 may be set in the phase differences $\Gamma_1$ and $\Gamma_2$ of the first and second wave plates. Here, the optical axis adjustment amount a is set so that $0°<a<a_{max}$, and the maximum value $a_{max}$ of the optical axis adjustment amount is determined by the following expressions:

$a_{max}=A_0+A_1\cdot\varphi+A_2\cdot\varphi^2$;

$A_0=-0.15869$;

$A_1=0.13912$; and $A_2=-0.00066$.

Accordingly, it is possible to set the wave plates to a thickness which can be processed in manufacturing. By setting the angle φ, it is possible to simply design the laminated half-wave plate which can provide an excellent conversion efficiency in a broader band.

In the laminated half-wave plate, the in-plane bearing angles $\theta_1$ and $\theta_2$ may each satisfy $22.5°<\theta_1<45.0°$ and $45.0°<\theta_2<67.5°$.

In the laminated half-wave plate, the first and second wave plates may be formed of a quartz crystal plate. Accordingly, it is possible to obtain very high light resistance. Particularly, even in an optical system employing a short-wavelength violet-blue laser beam with high power, it is possible to obtain high reliability.

According to another aspect of the invention, there is provided an optical pickup device including: a light source; an objective lens focusing a beam emitted from the light source on a recording medium; a detector detecting the beam reflected from the recording medium; and the above-mentioned laminated half-wave plate which is disposed in an optical path between the light source and the objective lens. As described above, by employing the laminated half-wave plate in which the deterioration in conversion efficiency in the wavelength range with a broad bandwidth is suppressed as much as possible, it is possible to achieve an optical pickup device which is hardly affected by the variation in wavelength due to a temperature drift of the oscillated laser beam when being used and which can exhibit stable and excellent performance in the wavelength range with a broader bandwidth.

According to another aspect of the invention, there is provided a polarization converter including a flat light-transmitting substrate having a first main surface as a beam incidence surface and a second main surface as a beam output surface, first and second thin optical films disposed in the substrate, and a wave plate. Here, the first and second thin optical films are alternately arranged in parallel to be tilted about the first and second main surfaces with a gap therebetween. The first thin optical film separates a beam input from the first main surface into a first linearly-polarized beam and a second linearly-polarized beam perpendicular to each other, transmits the first linearly-polarized beam, and reflects the second linearly-polarized beam. The second thin optical film reflects the second linearly-polarized beam reflected by the first thin optical film and emits the reflected second linearly-polarized beam from the second main surface. The wave plate is the laminated half-wave plate which is disposed at a position at which the first or second linearly-polarized beam separated by the first thin optical film is transmitted.

In the polarization converter, the laminated half-wave plate is disposed in a part of the second main surface emitting the first linearly-polarized beam transmitted by the first thin optical film or in a part of the second main surface emitting the second linearly-polarized beam reflected by the second thin optical film. In another example, the laminated half-wave plate may be disposed in a light-transmitting substrate and may be laminated on the emission surface of the first linearly-polarized beam of the first thin optical film. In any case, by employing the laminated half-wave plate in which the deterioration in conversion efficiency in the wavelength range with a broad bandwidth is suppressed as much as possible, it is possible to achieve a polarization converter which has very high use efficiency of light in a broader band.

According to another aspect of the invention, there is provided a projection display apparatus including: a light source; the above-mentioned polarization converter for converting a beam from the light source into the second linearly-polarized beam and emitting the linearly-polarized beam; a modulator such as a liquid crystal panel for modulating the beam emitted from the polarization converter on the basis of image information to be projected; and a projection optical system for projecting a beam modulated by the modulator. Similarly, as described above, by employing the laminated half-wave plate in which the deterioration in conversion efficiency in the wavelength range with a broader bandwidth is suppressed as much as possible, it is possible to obtain a brighter image with the light source having the same power and to obtain an image having the same brightness even with a low-power light source, thereby reducing power consumption.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in detail with reference to the accompanying drawings.

Figure 1A:
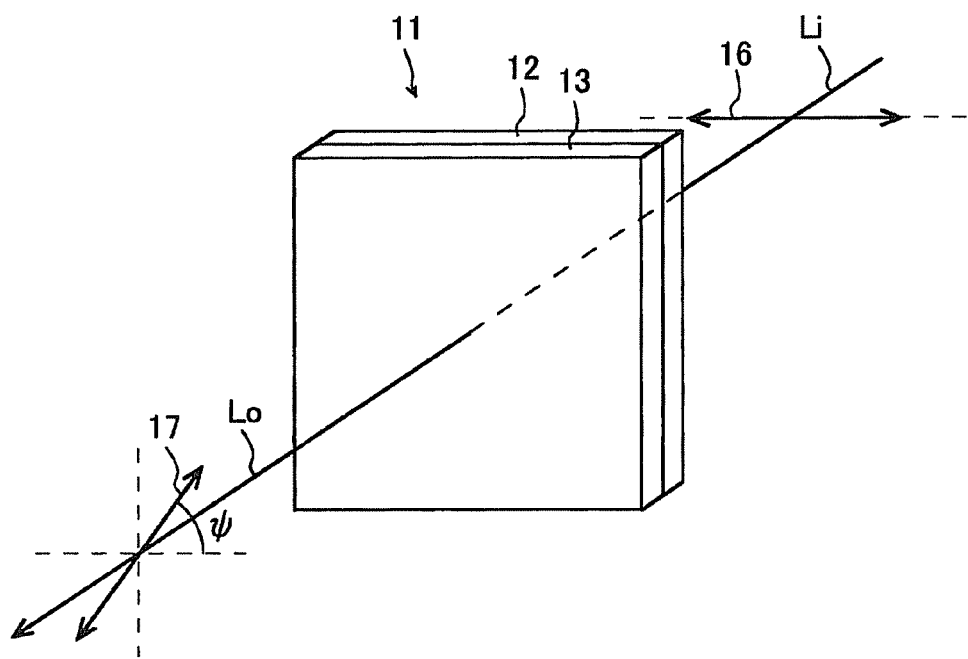
FIG. 1A is a perspective view illustrating a laminated half-wave plate according to an embodiment of the invention as viewed from an output side of a beam and FIG. 1B is a front view of the laminated half-wave plate as viewed from the output side.
Figure 1B:
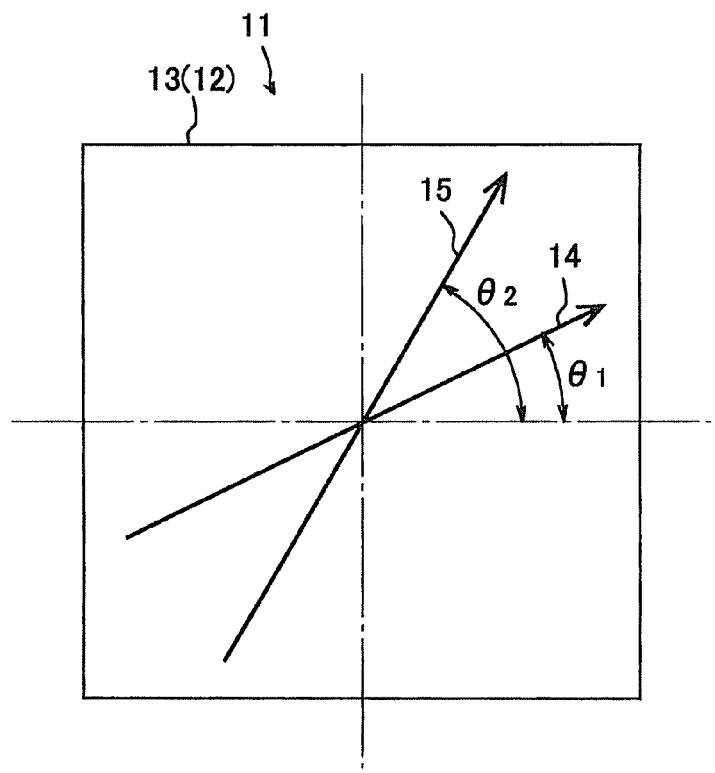

FIGS. 1A and 1B are diagrams illustrating a laminated half-wave plate according to an embodiment of the invention. The laminated half-wave plate 11 according to this embodiment includes first and second wave plates 12 and 13 formed of a quartz crystal plate which are arranged sequentially from the light incidence side Li to the light output side Lo. The first and second wave plates are bonded so that crystal optical axes 14 and 15 intersect each other at a predetermined angle.

The phase difference of the first wave plate 12 is set to $\Gamma_1=180°+n\times360°$ and the phase difference of the second wave plate 13 is set to $\Gamma_2=180°+n\times360°$ (where n in $\Gamma_1$ and $\Gamma_2$ is a non-negative integer). An optical axis bearing angle $\theta_1$ of the first wave plate 12 is an angle formed by the crystal optical axis 14 and the polarization plane of the linearly-polarized beam 16 incident on the laminated half-wave plate 11. An optical axis bearing angle $\theta_2$ of the second wave plate 13 is an angle formed by the crystal optical axis 15 and the polarization plane of the linearly-polarized beam 16 of the incident beam.

In the laminated half-wave plate 11, the angle φ formed by the polarization direction of the incident linearly-polarized beam 16 and the polarization direction of the output linearly-polarized beam 17 is set so that $15°\leq\phi\leq90°$. Here, when an optical axis adjustment amount is a, the optical axis bearing angles $\theta_1$ and $\theta_2$ are set to satisfy the following expressions.

$$\theta_1=\phi/4+a$$

$$\theta_2=3\phi/4-a$$

Figure 2A:
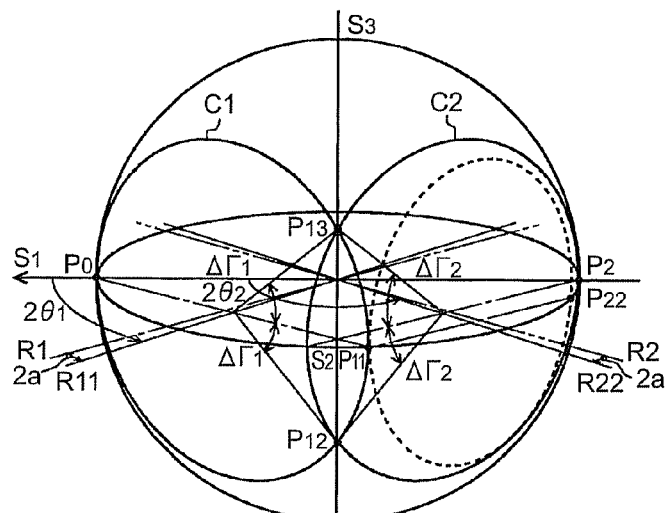
FIG. 2A is a diagram illustrating a Poincare sphere indicating the polarization state of the laminated half-wave plate shown in FIGS. 1A and 1B.
Figure 2B:
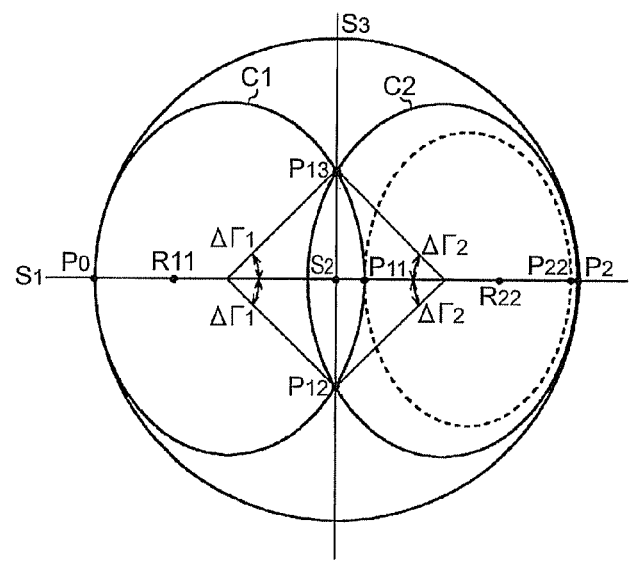
FIG. 2B is a diagram of the Poincare sphere as viewed from the direction of an axis S2.
Figure 2C:
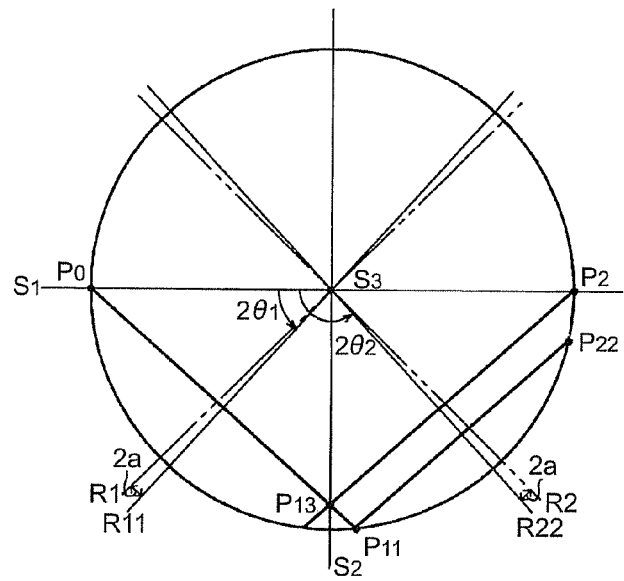
FIG. 2C is a diagram of the Poincare sphere as viewed from the direction of an axis S3.
Figure 17A:
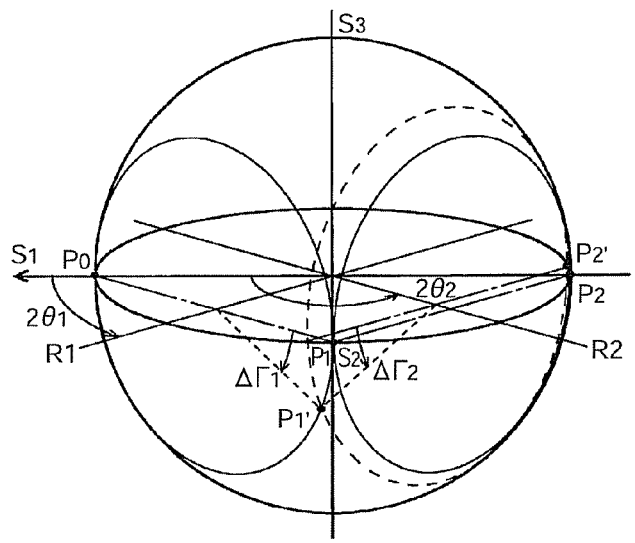
FIG. 17A is a diagram illustrating a Poincare sphere indicating the polarization state of the laminated half-wave plate shown in FIGS. 16A and 16B.
Figure 17B:
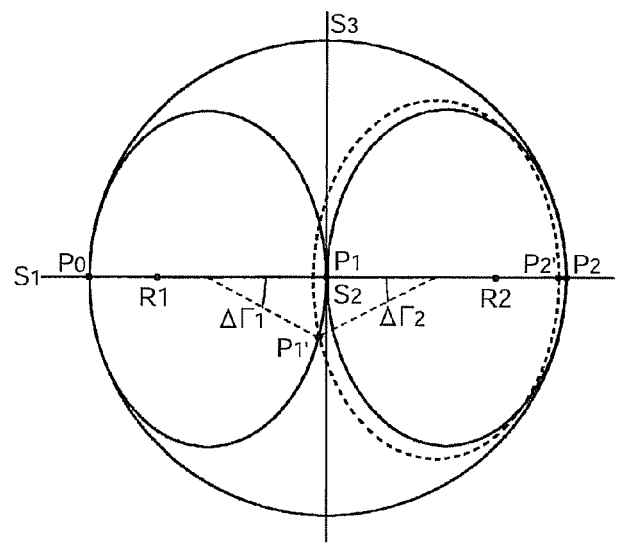
FIG. 17B is a diagram of the Poincare sphere as viewed from the direction of the axis S2.
Figure 17C:
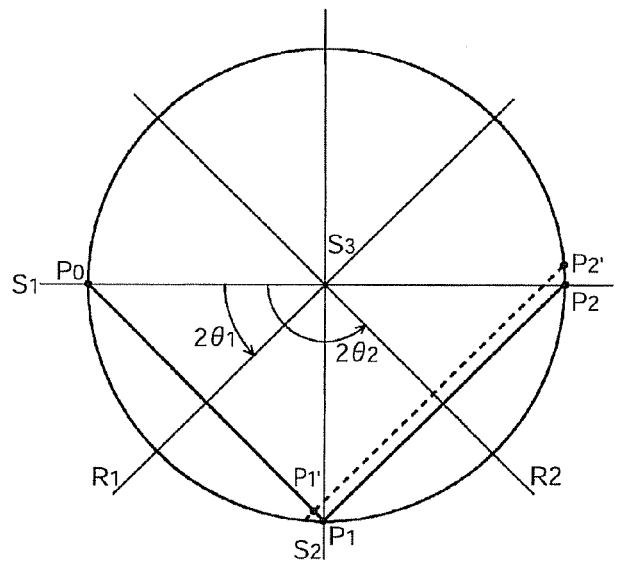
FIG. 17C is a diagram of the Poincare sphere as viewed from the direction of the axis S3.
Figure 18:
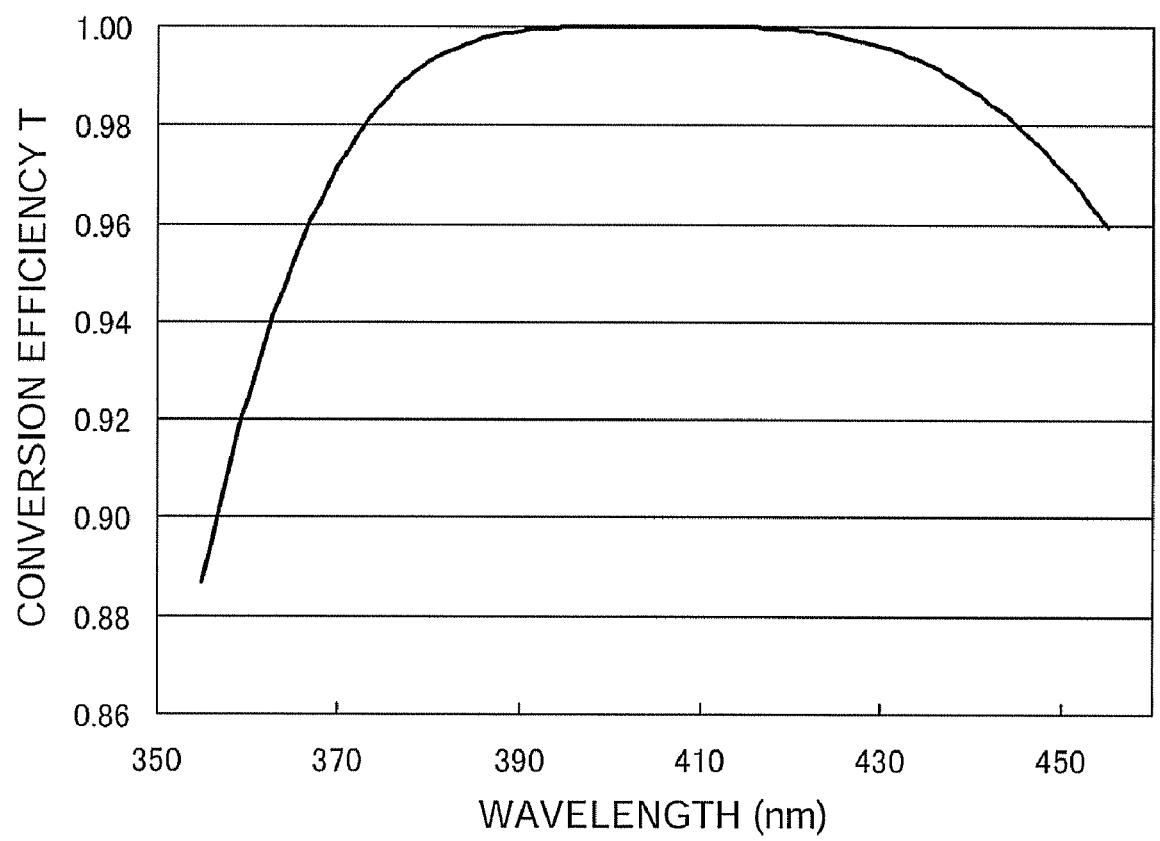
FIG. 18 is a diagram illustrating a variation in conversion efficiency with respect to the wavelength of the laminated half-wave plate shown in FIGS. 16A and 16B.

The polarization state of the laminated half-wave plate 11 is described now using a Poincare sphere shown in FIGS. 2A to 2C. FIG. 2A is a diagram illustrating a trajectory transition in the Poincare sphere of the linearly-polarized beam incident on the laminated half-wave plate 11. A position in the equatorial line at which the linearly-polarized beam is incident is set to a point $P_0$ in an axis S1. FIG. 2B is a view illustrating the locus of the polarization state of a beam incident on the laminated half-wave plate 11 as viewed from an axis S2 in the Poincare sphere shown in FIG. 2A, that is, a projected diagram onto the plane S1S3. FIG. 2C is a view illustrating the locus of the polarization state of a beam incident on the laminated half-wave plate 11 as viewed from an axis S3 in the Poincare sphere shown in FIG. 2A, that is, a projected diagram onto the plane S1S2. FIGS. 2A to 2C show an example with φ=90° for the purpose of easy comparison with the related art shown in FIGS. 17A to 17C.

The reference point of the incident beam is set to $P_0=(1, 0, 0)$ and the rotation axis $R_{11}$ of the first wave plate 12 is set to a position which is rotated from the axis S1 by $2\theta_1$. In this embodiment, since the optical axis bearing angle $\theta_1$ is set as described above, the rotation axis $R_{11}$ goes to the position which is rotated forward from the rotation axis $R_1$ with $\theta_1=22.5°$ in FIGS. 17A to 17C by 2a. The rotation axis $R_{22}$ of the second wave plate 13 is similarly set to a position which is rotated from the axis S1 by $2\theta_2$. Since the optical axis bearing angle $\theta_2$ is set as described above, the rotation axis $R_{22}$ goes to the position which is rotated backward from the rotation axis $R_2$ with $\theta_2=67.5°$ in FIGS. 17A to 17C by 2a.

The position of the output beam of the first wave plate 12 is a point on a circle C1 of the locus drawn in the Poincare sphere when a reference point $P_0$ is rotated about the rotation axis $R_{11}$ in the right direction by the phase difference $\Gamma_1$. The circle C1 intersects an S2-S3 plane including the axes S2 and S3 at two points. Accordingly, when the phase difference $\Gamma_1$ is the set value, a position $P_{11}$ in the equatorial line which is slightly deviated from the point (0, 1, 0) of the Poincare sphere in the reverse direction of the reference point $P_0$ becomes the position of the output beam of the first wave plate.

The output beam of the second wave plate 13 is located at a point on the Poincare sphere when the position $P_{11}$ is rotated about the rotation axis $R_{22}$ in the right direction by the phase difference $\Gamma_2$. When the phase difference $\Gamma_2$ is the set value, a position $P_{21}$ in the equatorial line which is slightly turned back from the point $P_2$ (−1, 0, 0) of the Poincare sphere toward the reference point $P_0$ becomes the position of the output beam of the second wave plate, that is, the position of the output beam of the laminated half-wave plate 11. As a consequence, as for the output beam, the rotation of the polarization plane is deviated from a desired angle φ=90°.

In order for the rotation angle of the polarization plane of the output beam to become 90°, the position of the output beam on the Poincare sphere is required to reach the point $P_2$ (−1, 0, 0). In this case, the position of the output beam of the first wave plate 12 has to be a point on the Poincare sphere when the point $P_{11}$ is rotated about the rotation axis $R_{22}$ in the reverse direction, that is, the left direction by the phase difference $\Gamma_2$. At this time, a circle C2 on the locus drawn on the Poincare sphere by rotating the point $P_{11}$ about the rotation axis $R_{22}$ is symmetric with the circle C1 with respect to the S2-S3 plane, that is, has a mirror image relationship.

The circles C1 and C2 have two intersection points $P_{12}$ and $P_{13}$ on the S2-S3 plane. Since the same phase differences $\Gamma_1$ and $\Gamma_2$ are set in the first wave plate 12 and the second wave plate 13, differences $\Delta\Gamma_1$ and $\Delta\Gamma_2$ of the phase differences due to the deviation in the wavelength of the incident beam are also the same. Accordingly, when the position of the output beam of the first wave plate 12 on the Poincare sphere becomes the intersection points $P_{12}$ or $P_{13}$ between the circles C1 and C2 due to the deviation of the phase difference $\Gamma_1$, the position of the output beam of the second wave plate 13 reaches the point $P_2$ (−1, 0, 0).

As a result, in the output beam of the laminated half-wave plate 11, there exists the wavelength at which the rotation angle of the polarization plane is a desired angle $\phi=90°$ on both positive and negative sides of a target wavelength $\lambda$. When the laminated half-wave plate 11 has a necessary function of a half-wave plate at the target wavelength $\lambda$, the wavelength range, which corresponds to the phase difference range having the differences $\Delta\Gamma_1$ and $\Delta\Gamma_2$ of the phase differences of at least two points $P_{12}$ or $P_{13}$ in the Poincare sphere as the maximum values of the allowable deviation with respect to the designed phase differences $\Gamma_1$ and $\Gamma_2$, is considered as a usable wavelength range of the laminated half-wave plate 11 of which the central wavelength is the target wavelength $\lambda$.

Figure 3:
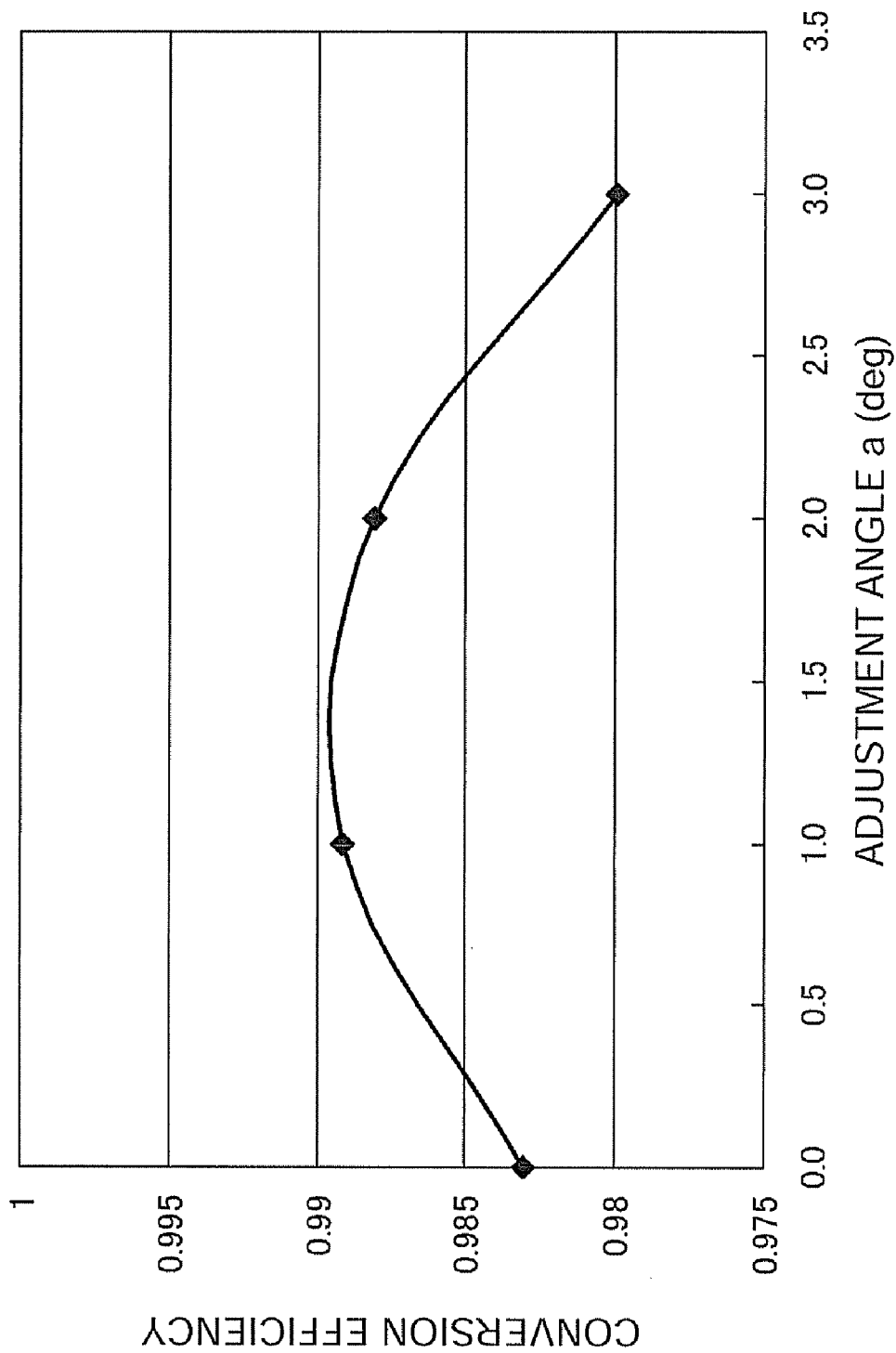
FIG. 3 is a diagram illustrating conversion efficiency with respect to an optical axis adjustment amount of the laminated half-wave plate.

The usable wavelength range, where the necessary function of the laminated half-wave plate 11 can be exhibited, is determined by the set position of the rotation axes $R_{11}$ and $R_{22}$ on the Poincare sphere, that is, by the set value of the optical axis adjustment amount a. Thus, the conversion efficiency of the laminated half-wave plate 11 for the optical axis adjustment amount a is simulated using the above-described calculation method according to the related art. FIG. 3 is a diagram illustrating the average value of the conversion efficiency calculated by setting the used wavelength range to 405 nm±20 nm in the range of $0°\leq a \leq 3.0°$. As shown in the drawing, since there exists the optical axis adjustment amount a taking the maximum value of the conversion efficiency, it is supposed that there exists an optimum range of the optical axis adjustment amount a at which the decrease in conversion efficiency is suppressed as much as possible. In the following description, the conversion efficiency of the laminated half-wave plate according to the embodiment of the invention is simulated using the same calculation method.

Figure 4:
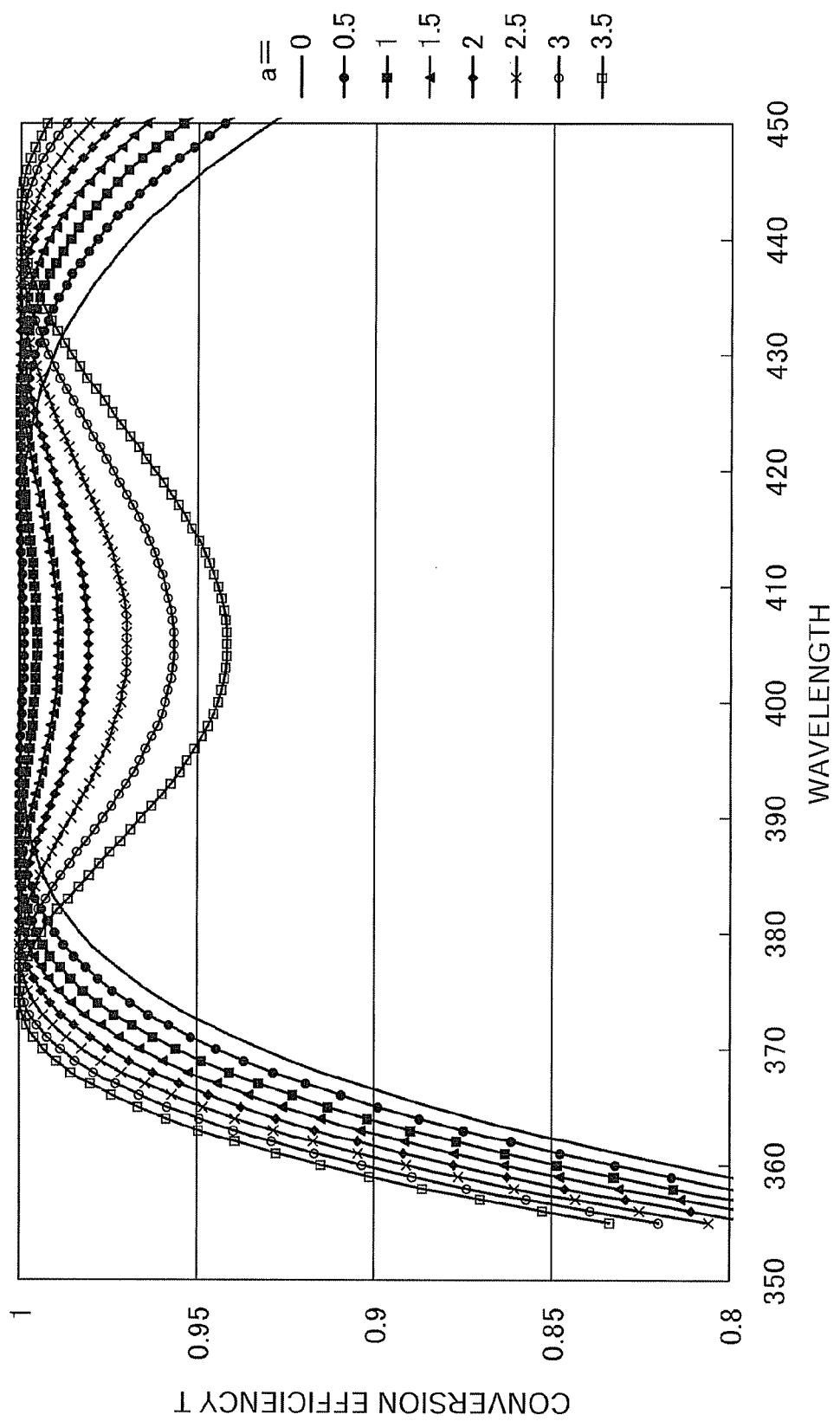
FIG. 4 is a diagram illustrating conversion efficiency with respect to frequency of the laminated half-wave plate with another optical axis adjustment amount.

The conversion efficiency is simulated by varying the optical axis adjustment amount a by 0.5° from 0° to 3.5° under the condition of the central wavelength $\lambda_0$=405 nm and the wavelength range of 355 nm$\leq \lambda \leq$450 nm. The result is shown in FIG. 4. It can be seen from FIG. 4 that the wavelength position at which the conversion efficiency is 1 is greatly shifted toward the positive and negative sides of the central wavelength $\lambda_0$ with an increase of the optical axis adjustment amount a, while the conversion efficiency deteriorates at the central wavelength $\lambda_0$. In effect, the allowable value of the conversion efficiency at the central wavelength and the used bandwidth are determined depending on the usage and the specification of the laminated half-wave plate, and the optical axis adjustment amount a is determined depending on the allowable value and the used bandwidth.

It is preferable that the high-order mode of the phase differences $\Gamma_1$ and $\Gamma_2$ of the first wave plate 12 and the second wave plate 13 is set to n=1 or 2. When the high-order mode is set to n=3 or more, the wavelength bandwidth in which the satisfactory conversion efficiency of 1 or close to 1 can be obtained becomes narrower, and thus it is difficult to achieve the effect of the broader bandwidth according to the invention. The following simulation is described on the assumption that the high-order mode is n=1, as long as otherwise stated.

Figure 5:
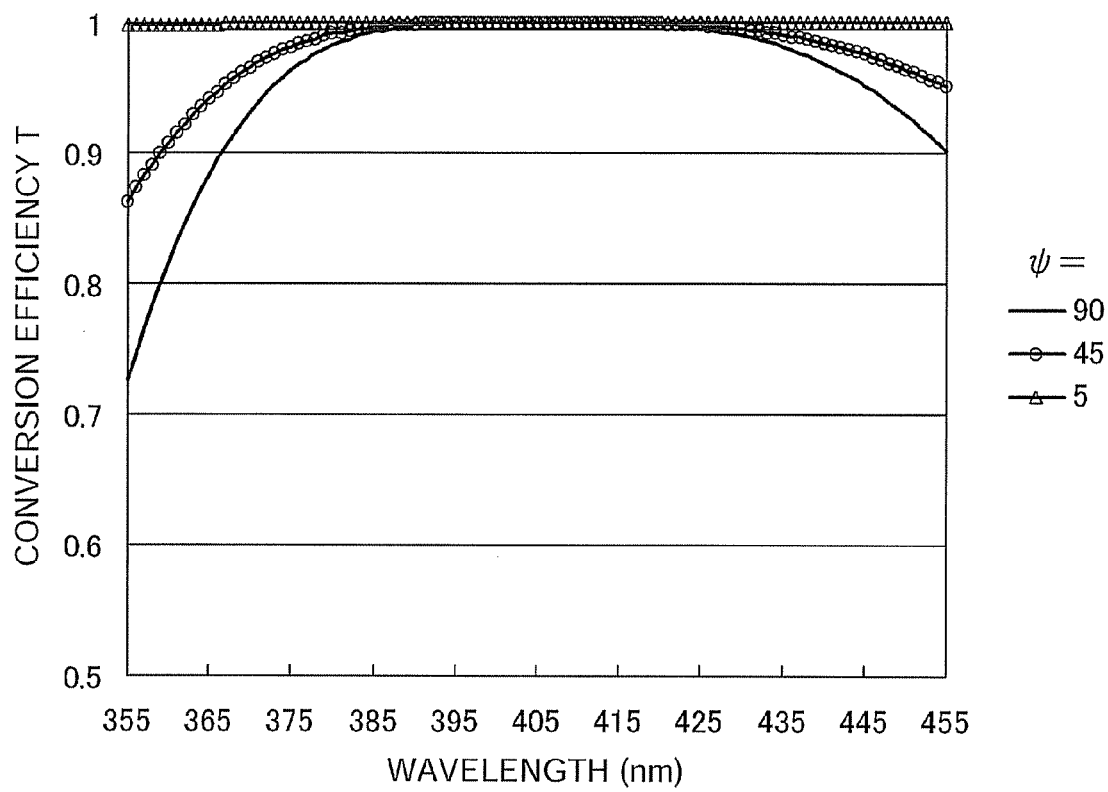
FIG. 5 is a diagram illustrating conversion efficiency with respect to frequency of the laminated half-wave plate with another polarization plane rotation angle.

In order to determine the optimum range of the optical axis adjustment amount a, an influence of the rotation angle $\phi$ of the polarization plane of the output beam on the conversion efficiency is first simulated. The conversion efficiency is simulated by setting the rotation angles $\phi$ of the polarization plane to 5°, 45°, and 90° under the condition of the central wavelength $\lambda_0$ of 405 nm and the use wavelength range of 375 nm$\leq \lambda \leq$435 nm. The result is shown in FIG. 5. It can be seen from FIG. 5 that the conversion efficiency with respect to the change in wavelength considerably decreases with the increase of the angle $\phi$. Accordingly, it is supposed that there also exists the optimum range of the rotation angle $\phi$ of the polarization plane of the output beam in which the decrease of the conversion efficiency is suppressed as much as possible.

Figure 6:
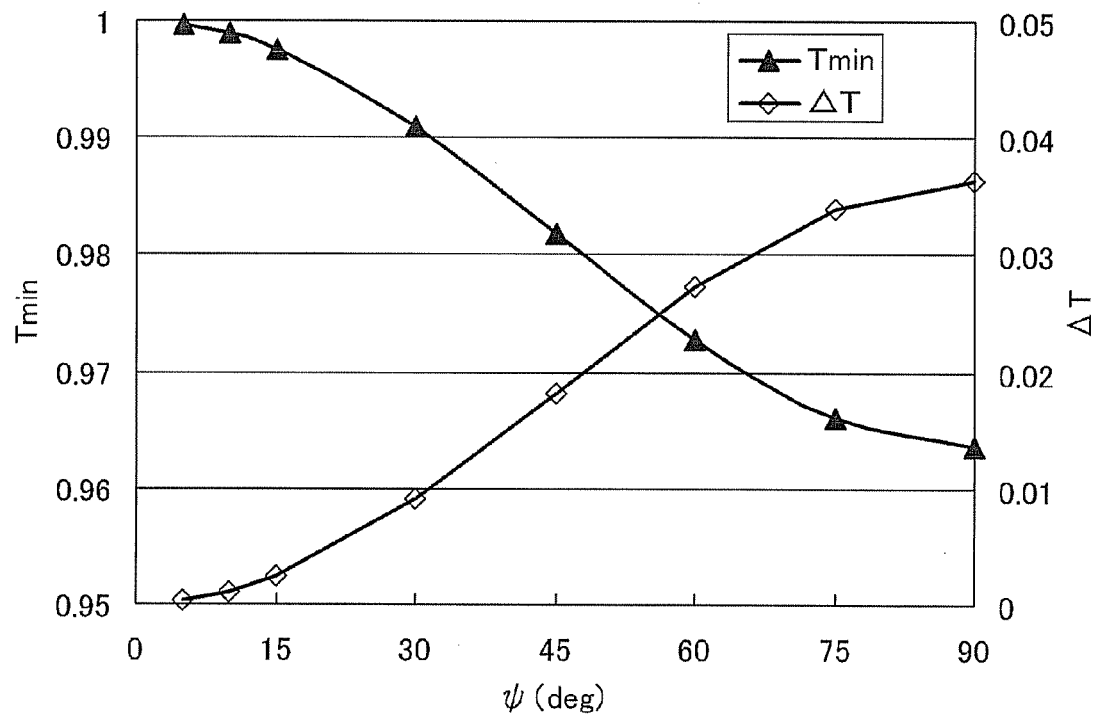
FIG. 6 is a diagram illustrating a minimum value of the conversion efficiency with respect to a polarization plane rotation angle and a difference between the minimum value and a maximum value of the conversion efficiency.

Therefore, in the case where the central wavelength $\lambda_0$ is set to 405 nm and the used wavelength range is set to be 375 nm$\leq \lambda \leq$435 nm, the minimum value Tmin of the conversion efficiency with respect to the rotation angle $\phi$ of the polarization plane of the output beam is simulated. In addition, the difference $\Delta T$ between the maximum value and the minimum value of the conversion efficiency with respect to the rotation angle $\phi$ of the polarization plane of the output beam is simulated. The results are shown in FIG. 6. As shown in the same drawing, it is understood that the conversion efficiency largely decreases with the increase of the angle $\phi$ and thus a variation in the conversion efficiency becomes large as in FIG. 5. In the drawing, at the angle $\phi<15°$, both the minimum value Tmin of the conversion efficiency and the difference $\Delta T$ between the maximum value and the minimum value of the conversion efficiency decrease to the error level. Accordingly, it is observed that the rotation angle $\phi$ of the polarization plane of the output beam, which exhibits the advantage of suppressing as much as possible the decrease of the conversion efficiency, is desirably set to be $15°\leq \phi \leq 90°$ as described above.

Figure 7:
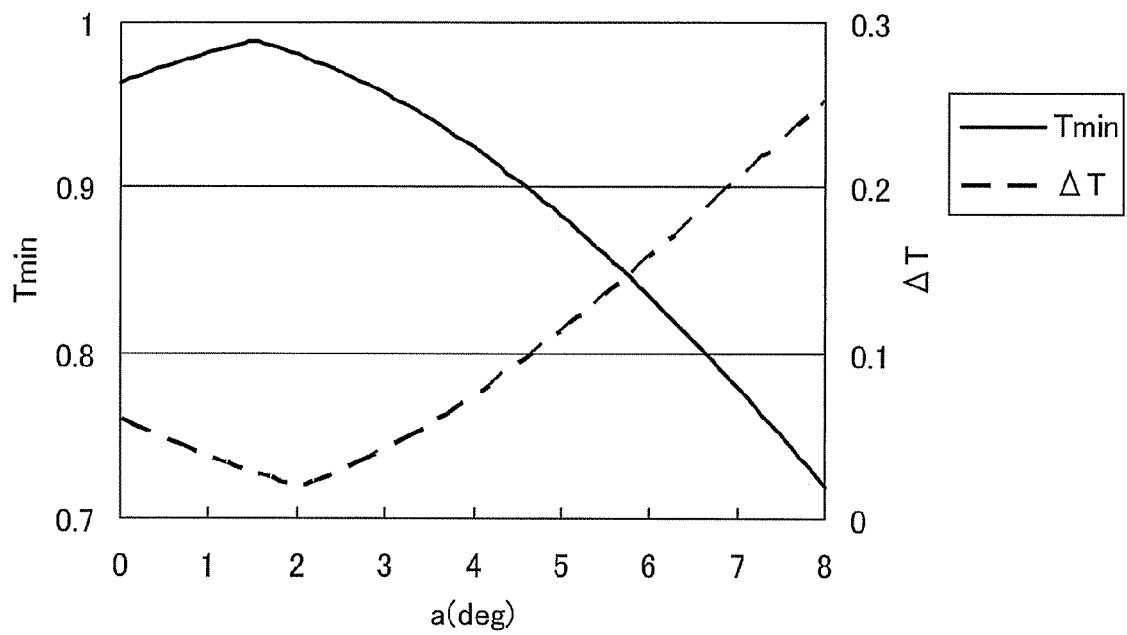
FIG. 7 is a diagram illustrating the minimum value of the conversion efficiency with respect to the optical axis adjustment amount and a difference between the minimum value and the maximum value of the conversion efficiency.

Next, in the case where the polarization plane rotation angle $\phi$ of the output beam is fixed to 90°, the central wavelength $\lambda_0$ is set to 405 nm, and the used wavelength range is set to 375 nm$\leq \lambda \leq$435 nm, the minimum value Tmin of the conversion efficiency with respect to the optical axis adjustment amount a ($0°\leq a \leq 8.0°$) is simulated. In addition, the difference $\Delta T$ between the maximum value and the minimum value of the conversion efficiency with respect to the optical axis adjustment amount a is simulated. The results are shown in FIG. 7. As shown in the same drawing, it is obviously observed that both the minimum value Tmin and the difference $\Delta T$ are the best values in the vicinity of the position where the optical axis adjustment amount a is 2°. In addition, the same drawing shows that the optical axis adjustment amount a is an optimal value, where the minimum value Tmin is large and the difference $\Delta T$ becomes small.

Figure 8:
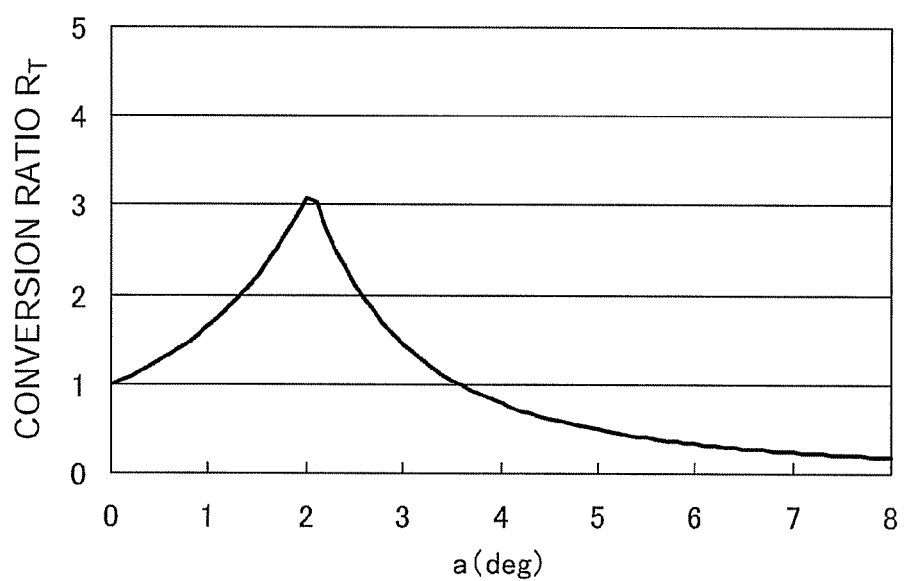
FIG. 8 is a diagram illustrating a conversion ratio with respect to the optical axis adjustment amount.

Therefore, when a value, which is obtained by dividing the minimum value Tmin of the conversion efficiency by the difference $\Delta T$ between the maximum value and the minimum value of the conversion efficiency, is denoted by the conversion ratio RT and the value is used as an estimated value of the conversion efficiency, FIG. 7 can be expressed in the same way as shown in FIG. 8. That is, FIG. 8 shows a variation in the conversion ratio RT with respect to the optical axis adjustment amount a. As shown in the same drawing, in the range of $0 < a < 3.5°$, it is understood that the conversion efficiency becomes better than the case of $a=0°$, that is, the conversion efficiency is good.

Figure 9:
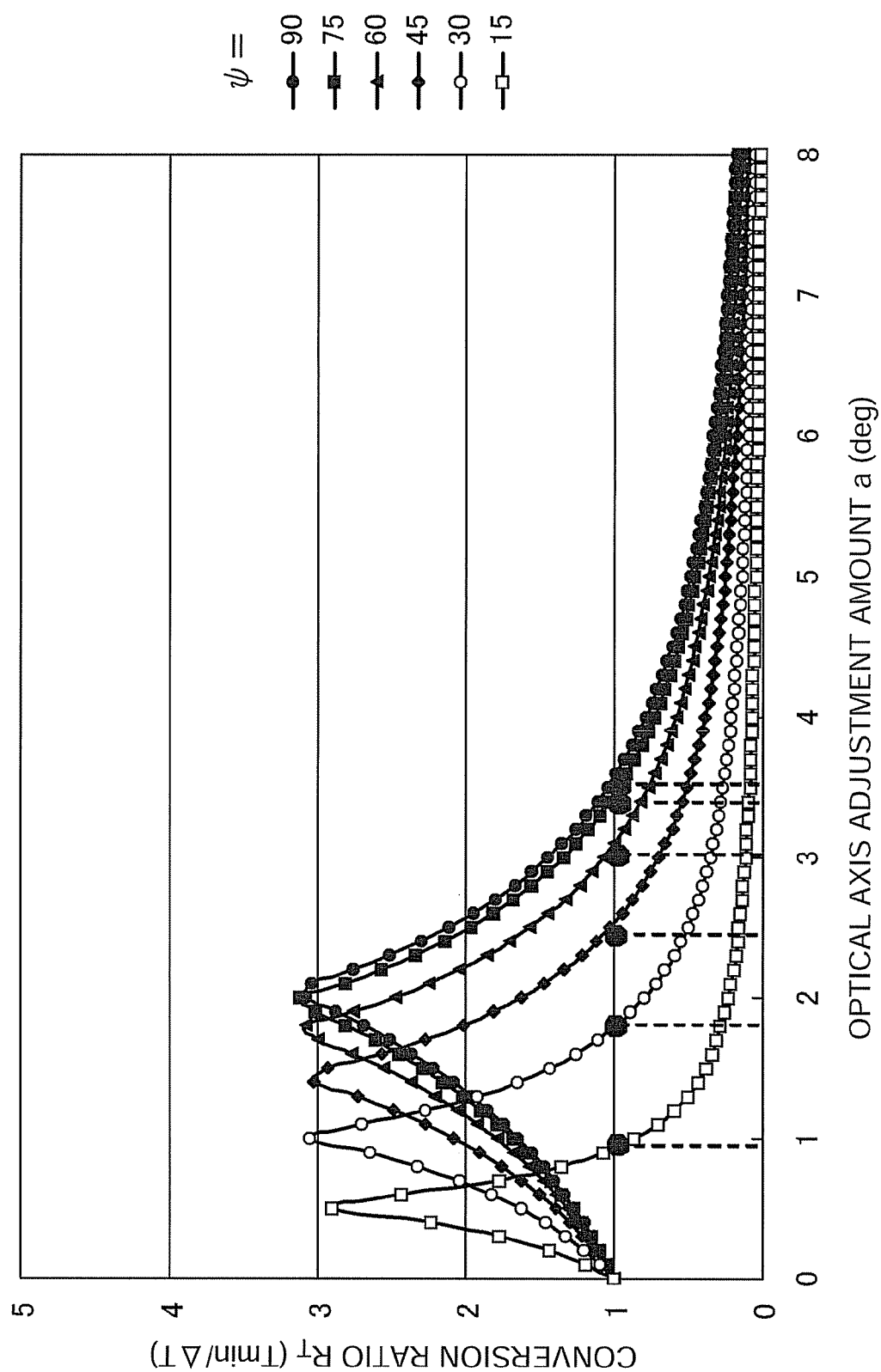
FIG. 9 is a diagram illustrating a conversion ratio with respect to the optical axis adjustment amount at another polarization plane rotation angle.

In addition, in the case where the central wavelength $\lambda_0$ is set to 405 nm, the used wavelength range is set to 375 nm $\leq \lambda \leq$ 435 nm, and the polarization plane rotation angle $\phi$ is set to 15°, 30°, 45°, 60°, 75°, and 90°, a variation in the conversion ratio RT with respect to the optical axis adjustment amount a is simulated. The results are shown in FIG. 9. As shown in the same drawing, it is observed that each of the polarization plane rotation angles $\phi$ has a maximum value $a_{max}$ of the optical axis adjustment amount a for obtaining the conversion efficiency which is better than the case of $a=0°$.

Figure 10:
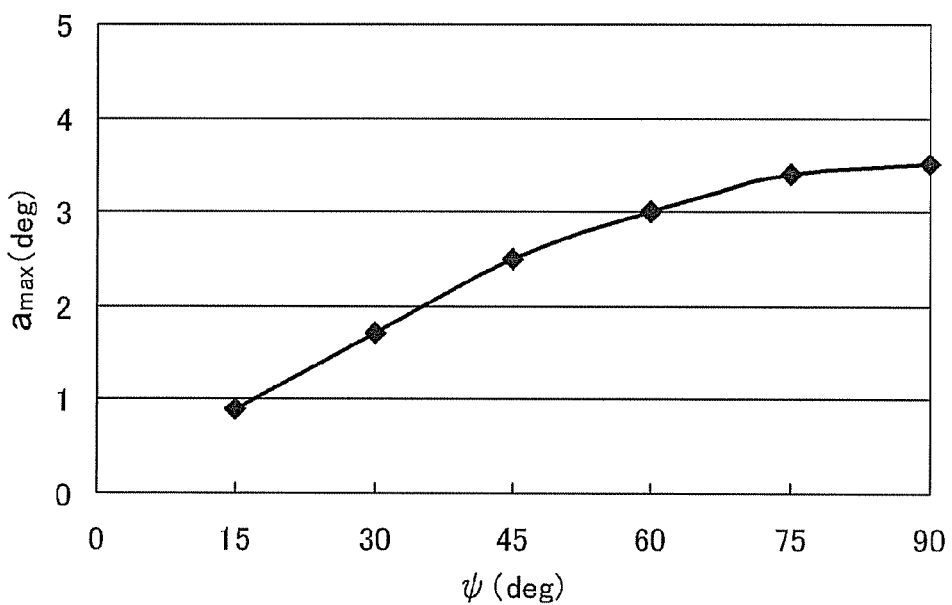
FIG. 10 is a diagram illustrating a relationship between the polarization plane rotation angle and a maximum value of the optical axis adjustment amount at which the conversion ratio becomes better than a=0° in the case of the high-order mode n=1.

From FIG. 9, the maximum value $a_{max}$ of the optical axis adjustment amount of each of the polarization plane rotation angles $\phi$ for obtaining the conversion efficiency which is better than the case of $a=0°$ is extracted, and the correlation thereof is shown in FIG. 10. When the correlation is expressed by an approximate expression, the following expressions are obtained:

$$a_{max} = A_0 + A_1 \cdot \phi + A_2 \cdot \phi^2$$

$$A_0 = -0.06032$$

$$A_1 = 0.0717$$

$$A_2 = -0.00035.$$

By using this relational expression, when the laminated half-wave plate according to the embodiment of the invention is in the state with the high-order mode $n=1$ and the rotation angle $\phi$ of the polarization plane is set, it is possible to simply determine the maximum value $a_{max}$ of the optical axis adjustment amount a for obtaining the satisfactory conversion efficiency by suppressing as much as possible the deterioration in the conversion efficiency in a wavelength range with a broader bandwidth.

In addition, even when the laminated half-wave plate has the high-order mode $n=2$, a variation in the conversion ratio RT with respect to the optical axis adjustment amount a is simulated while the rotation angle $\phi$ of the polarization plane is changed to 15°, 30°, 45°, 60°, 75°, and 90°. From the simulation result, the maximum value $a_{max}$ of the optical axis adjustment amount a for obtaining the conversion ratio which is better than the case of $a=0°$ for each rotation angle $\phi$ of the polarization plane is extracted.

Figure 11:
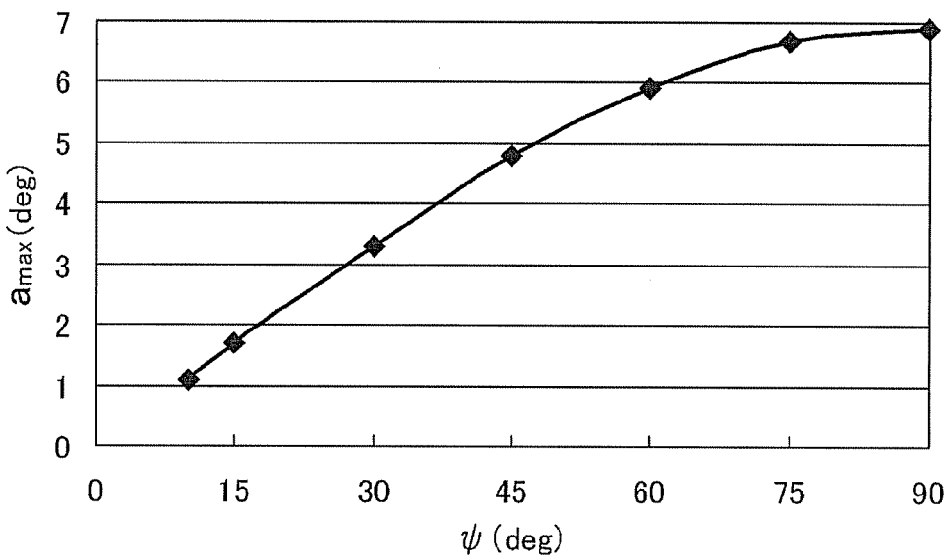
FIG. 11 is a diagram illustrating a relationship between the polarization plane rotation angle and a maximum value of the optical axis adjustment amount at which the conversion ratio becomes better than a=0° in the case of the high-order mode n=2.

The correlation between the polarization plane rotation angle $\phi$ and the maximum value $a_{max}$ of the optical axis adjustment amount is shown in FIG. 11. From FIG. 11, the range of the maximum value $a_{max}$ of the optical axis adjustment amount a is expressed by the following expression.

$$0 < a_{max} < 7.0$$

From FIG. 11, when the correlation between the rotation angle $\phi$ of the polarization plane and the maximum value $a_{max}$ of the optical axis adjustment amount is expressed by an approximate expression, the following expressions are obtained:

$$a_{max} = A_0 + A_1 \cdot \phi + A_2 \cdot \phi^2$$

$$A_0 = -0.15869$$

$$A_1 = 0.13912$$

$$A_2 = -0.00066.$$

By using this relational expression, when the rotation angle $\phi$ of the polarization plane is set in the laminated half-wave plate according to the embodiment of the invention with the high-order mode $n=2$, it is possible to simply determine the maximum value $a_{max}$ of the optical axis adjustment amount a for obtaining the satisfactory conversion efficiency by suppressing as much as possible the decrease in conversion efficiency in a wavelength range with a broader bandwidth.

Figure 12:
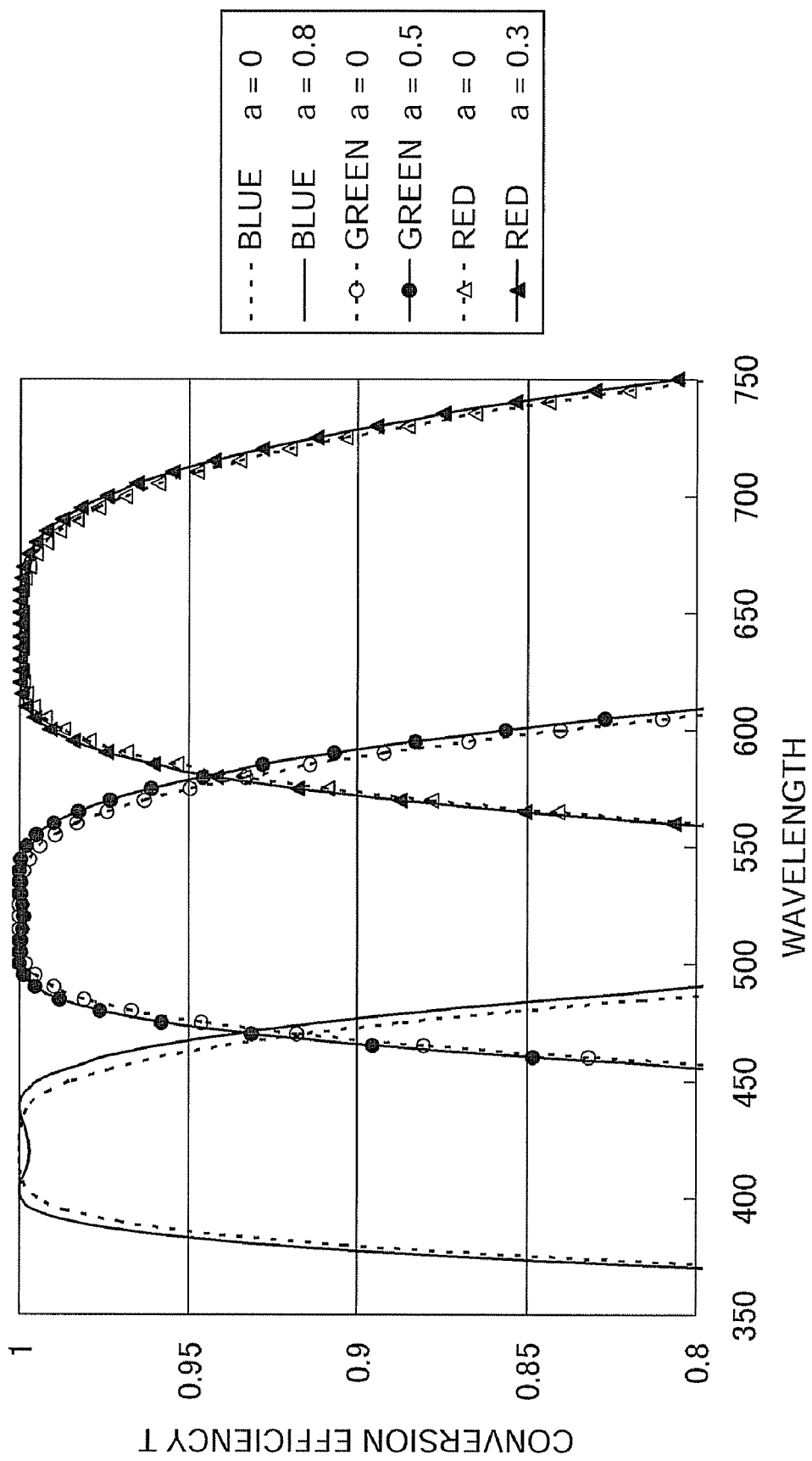
FIG. 12 is a diagram illustrating conversion efficiency with respect to wavelength in wavelength bands of blue, green, and red color beams.

In the above-described simulation, in all cases, the wavelength range in which the central wavelength is 405 nm is used, but the invention may be also applied to different wavelength ranges. FIG. 12 shows a variation in the conversion efficiency with respect to the wavelength in the wavelength bands of a green beam and a red beam respectively having the central wavelengths of 530 nm and 660 nm in addition to the wavelength range of a blue beam having the central wavelength of 405 nm. In the same drawing, each solid line indicates the conversion efficiency which can be obtained by applying the invention to the blue, green, and red color beams, and setting the optical axis adjustment amounts a of the first and second wave plates to appropriate values. On the contrary, each line depicted by the dashed line indicates the conversion efficiency obtained from the first and second wave plates of the related art in which the optical axis adjustment amount a is not set. As shown in the same drawing, it is understood that it is possible to obtain the satisfactory conversion efficiency substantially equal to 1 by suppressing as much as possible the deterioration in the conversion efficiency in a wavelength range with a broader bandwidth in the wavelength bands of a green beam and a red beam.

Figure 13:
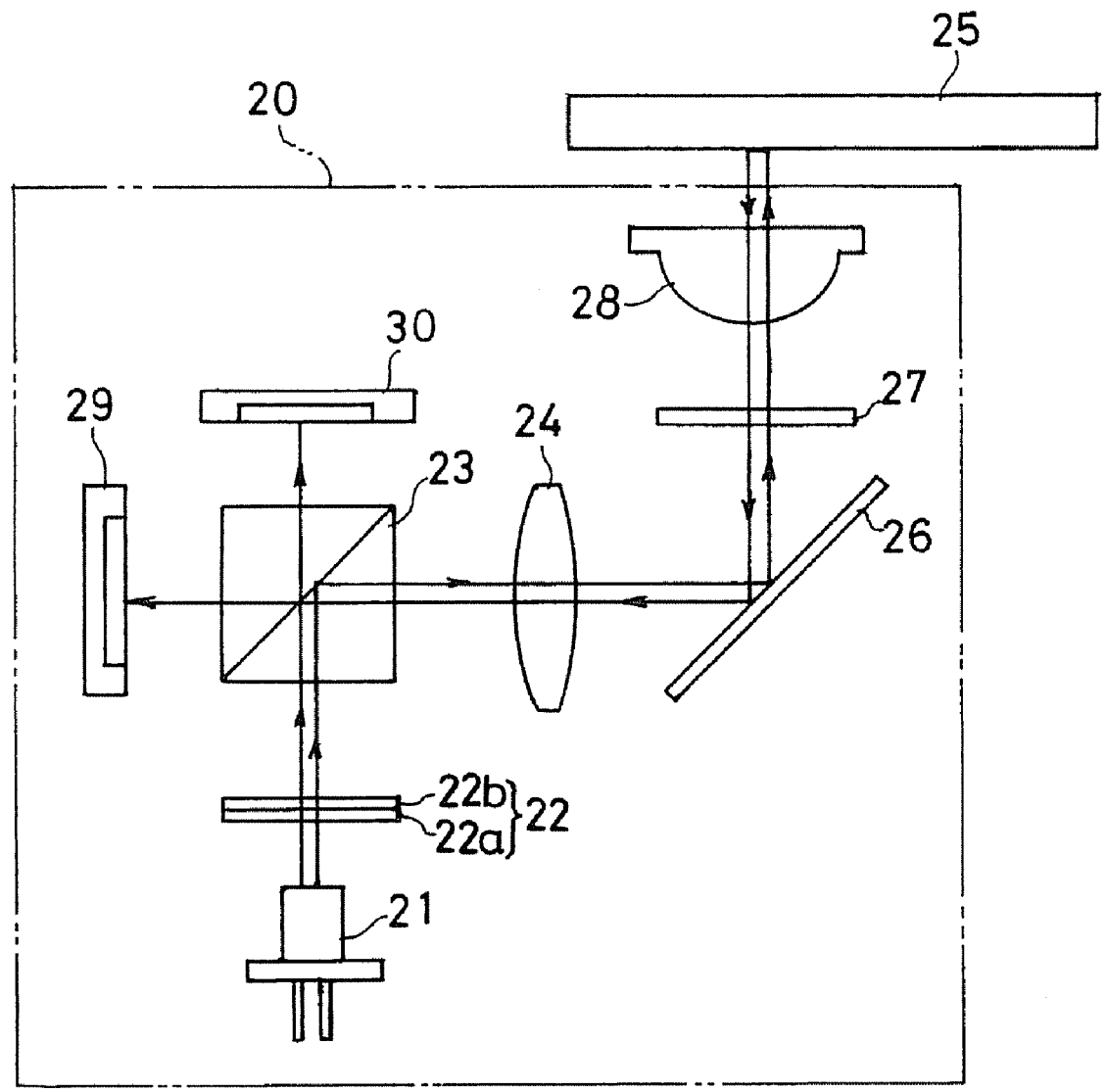
FIG. 13 is a schematic view illustrating a configuration of an optical pickup device using the laminated half-wave plate according to an embodiment of the invention.

FIG. 13 shows an optical pickup device using the laminated half-wave plate according to an embodiment of the invention. The optical pickup device 20 is used to record on and reproduce data from an optical disk device such as a Blu-ray Disc (trade mark), and includes a light source 21 formed of a laser diode emitting laser beam such as violet-blue light with a wavelength of 405 nm. The optical pickup device 20 is provided with a diffraction grating 22 for diffracting laser beam from the light source 21, a polarization beam splitter 23 dividing the laser beam transmitted by the diffraction grating 22 into a P-polarization component and an S-polarization component to transmit or reflect the beam, a collimator lens 24 making the laser beam reflected by the polarization beam splitter 23 into a parallel beam, a mirror 26 reflecting the laser beam passing through the collimator lens 24 toward an optical disk 25, a quarter-wave plate 27 converting the linearly-polarized laser beam reflected by the mirror 26 into circularly-polarized beam, an objective lens 28 collecting the laser beam passing through the quarter-wave plate 27, and a light detector 29 detecting the laser beam reflected from the optical disk 25. The optical pickup device 20 has an optical monitoring detector 30 detecting the laser beam output from the light source 21 and transmitted by the polarization beam splitter 23.

The operation of the optical pickup device 20 will be described now. The linearly-polarized laser beam output from the light source 21 is divided into three beams by the diffraction grating 22 for the tracking control based on a 3-beam method, and then the S-polarized component is reflected by the polarization beam splitter 23 and is made to be a parallel beam by the collimator lens 24. The parallel laser beam is totally reflected by the mirror 26, is converted into the circularly-polarized beam from the linearly-polarized beam by the quarter-wave plate 27, is collected by the objective lens 28, and is applied to a pit of a signal recording layer formed in the optical disk 25. The laser beam reflected by the pit is transmitted by the objective lens, is converted from the circularly-polarized beam into the linearly-polarized beam by the quarter-wave plate 27, is totally reflected by the mirror 26, is transmitted by the collimator lens 24 and the polarization beam splitter 23, and is incident on and detected by the light detector 29. Accordingly, the operation of reading the signals recorded on the optical disk is performed. The P-polarized component of the laser beam output from the light source 21 is transmitted by the polarization beam splitter 23 and is incident on and detected by the monitoring light detector 30. The output of the laser beam from the laser diode is controlled by the detection output.

The diffraction grating 22 includes a diffraction grating portion 22a dividing the laser beam as described above, and a half-wave plate 22b converting the incident laser beam into linearly-polarized beam rotated by a predetermined angle. The half-wave plate according to the embodiment of the invention is used as the half-wave plate 22b. Accordingly, even when the wavelength of the laser beam varies due to the temperature drift of the oscillated laser beam when the optical pickup device 20 is being used, the conversion efficiency of the half-wave plate 22b does not deteriorate or the deterioration is suppressed as much as possible, thereby constantly securing sufficient intensity of light. As a result, according to short wavelength and high output of the used laser beam, it is possible to realize the optical pickup device capable of exhibiting stable and satisfactory performance in a wavelength range with a broader bandwidth.

The laminated half-wave plate according to the embodiment of the invention is suitable for the use in a projection display apparatus provided with a liquid crystal panel, such as a liquid crystal projector, since use efficiency of light is very high. Particularly, in a projection display apparatus employing a liquid crystal panel modulating a light flux (S-polarized beam or P-polarized beam) in a particular polarization direction, the optical system is generally set so that linearly-polarized beam is unified to either the P-polarized beam or the S-polarized beam and is incident on the liquid crystal panel. Accordingly, the projection display apparatus is mounted with a polarization converter (PS converter) converting randomly-polarized beam from the light source into a P-polarized or S-polarized beam to raise the use efficiency of light.

Figure 14A:
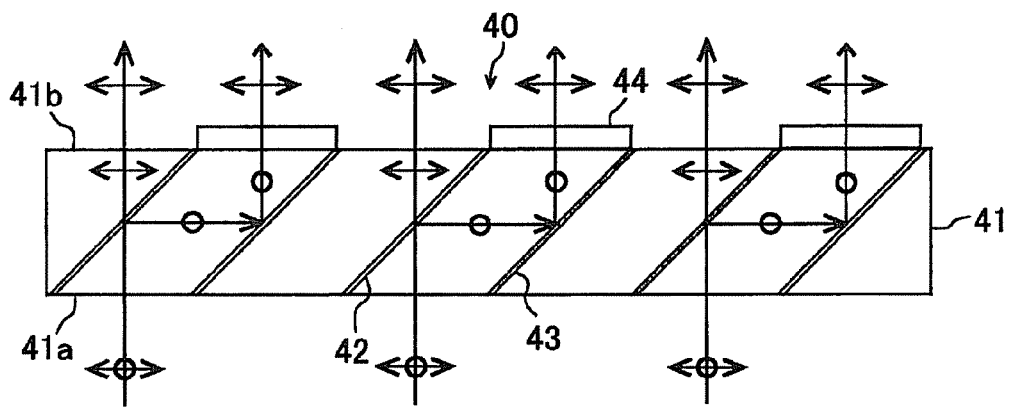
FIGS. 14A-14C are schematic views illustrating a configuration of a polarization converter using the laminated half-wave plate according to an embodiment of the invention.
Figure 14B:
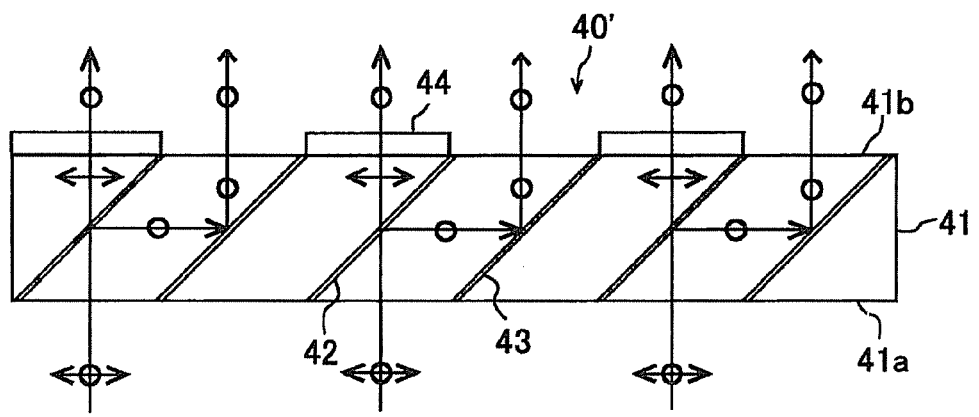
Figure 14C:
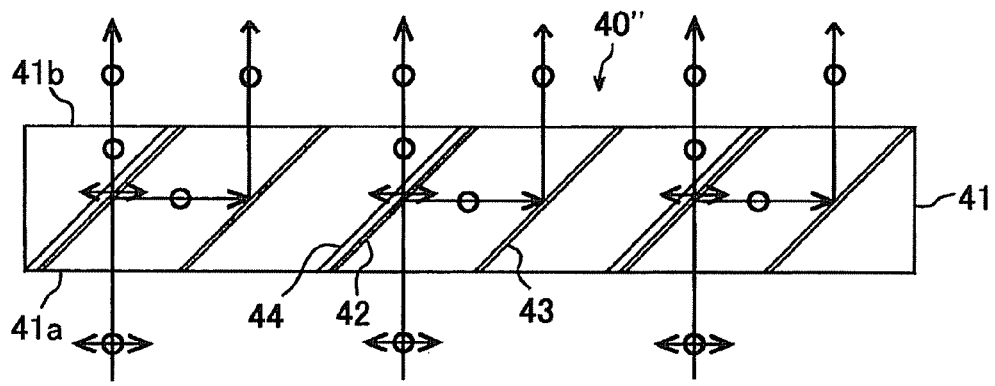

FIGS. 14A to 14C show three polarization converters 40, 40', and 40" with different configurations, which are suitable for the projection display apparatus such as the liquid crystal projector, and the laminated half-wave plate according to the embodiment of the invention can be used for any one of them. Accordingly, the polarization converters 40, 40', and 40" can suppress as much as possible the deterioration in conversion efficiency in a wavelength range with a broader bandwidth, and thus it is possible to more efficiently use light energy.

The polarization converter 40 shown in FIG. 14A is provided with a prism array 41 formed of a planar light-transmitting substrate having a first main surface 41a as a light incident surface and a second main surface 41b as a light output surface. In the light-transmitting substrate, a polarization separating film 42 tilted about the first and second main surfaces and the reflective film 43 are alternately arranged in parallel with a predetermined gap therebetween.

The polarization separating film 42 separates the random light, which is incident on the prism array 41 from the first main surface 41a, into the S-polarized component and the P-polarized component, and then transmits the P-polarized component and reflects the S-polarized component. The P-polarized component transmitted by the polarization separating film 42 is output from the prism array 41 through the second main surface 41b as it is. The S-polarized component reflected from the polarization separating film is reflected by the reflective film 43, and is output from the prism array 41 through the second main surface 41b. At the second main surface 41b, the half-wave plate 44 is disposed in the portion where the S-polarized component reflected by the reflective film is output. The half-wave plate 44 converts the incident linearly-polarized beam of the S polarization into the P-polarized beam and outputs the P-polarized beam. In this manner, the polarization converter 40 is configured so as for the incident beam to be output in parallel as the P-polarized beam, and can thus be suitably mounted on the projection display apparatus of the P-polarization optical system.

FIG. 14B shows the configuration of the polarization converter 40' which is appropriate to be mounted in the projection display apparatus of the S polarization optical system. In the polarization converter 40', the half-wave plate 44 is disposed in a portion of the second main surface 41b where the P-polarized component transmitted through the polarization separating film 42 is output. Herewith, the linearly-polarized beam of the P-polarized beam transmitted by the polarization separating film 42 is converted into the S-polarized beam and is then output. On the other hand, the S-polarized component reflected by the polarization separating film is reflected by the reflective film 43, and then is output from the prism array 41 as the S-polarized beam. Accordingly, the beam incident on the polarization converter 40' is arranged and output as the S-polarized beam.

FIG. 14C shows the polarization converter 40" with a structure where a half-wave plate 44 is disposed in the light-transmitting substrate of the prism array 41. The half-wave plate 44 is laminated on the output surface of the polarization separating film 42, and is disposed in parallel to and with a predetermined distance from the reflective film 43.

The polarization separating film 42 separates the random beam incident from the first main surface 41a into the S-polarized component and the P-polarized component, and then transmits the P-polarized component and reflects the S-polarized component. The S-polarized component reflected by the polarization separating film 42 is reflected by the reflective film 43, and is output from the prism array 41 through the second main surface 41b. The P-polarized component transmitted by the polarization separating film is directly incident on the half-wave plate 44 and converted into the S-polarized beam, and then is output from the prism array 41 through the second main surface. In this manner, the beam incident on the polarization converter 40" is arranged and output as the S-polarized beam.

When the laminated half-wave plate according to the embodiment of the invention is used as the half-wave plate 44 of the polarization converter 40", the first and the second wave plates constituting this may be set such that each of the plate thicknesses satisfies the following relationship of the phase differences $\Gamma_1$ and $\Gamma_2$ thereof in the traveling direction of the transmitted light, i.e., in 45° direction for the first and second main surfaces 41a and 41b.

$$\Gamma_1 = 180° + n \times 360°$$

$$\Gamma_2 = 180° + n \times 360°$$

(where n in $\Gamma_1$ and $\Gamma_2$ is a non-negative integer)

The optical axis bearing angles of the first and the second wave plates may be set such that the projection angles $\theta_1$ and $\theta_2$ to the first main surface 41a of these optical axes satisfy the following relationship.

$$\theta_1 = \phi/4 + a$$

$$\theta_2 = 3\phi/4 - a$$

$$22.5° < \theta_1 < 45.0°$$

$$45.0° < \theta_2 < 67.5°$$

Here, the in-plane bearing angles of the optical axes in the first and the second wave plates are smaller than the projection angles onto the first and the second main surfaces.

Figure 15:
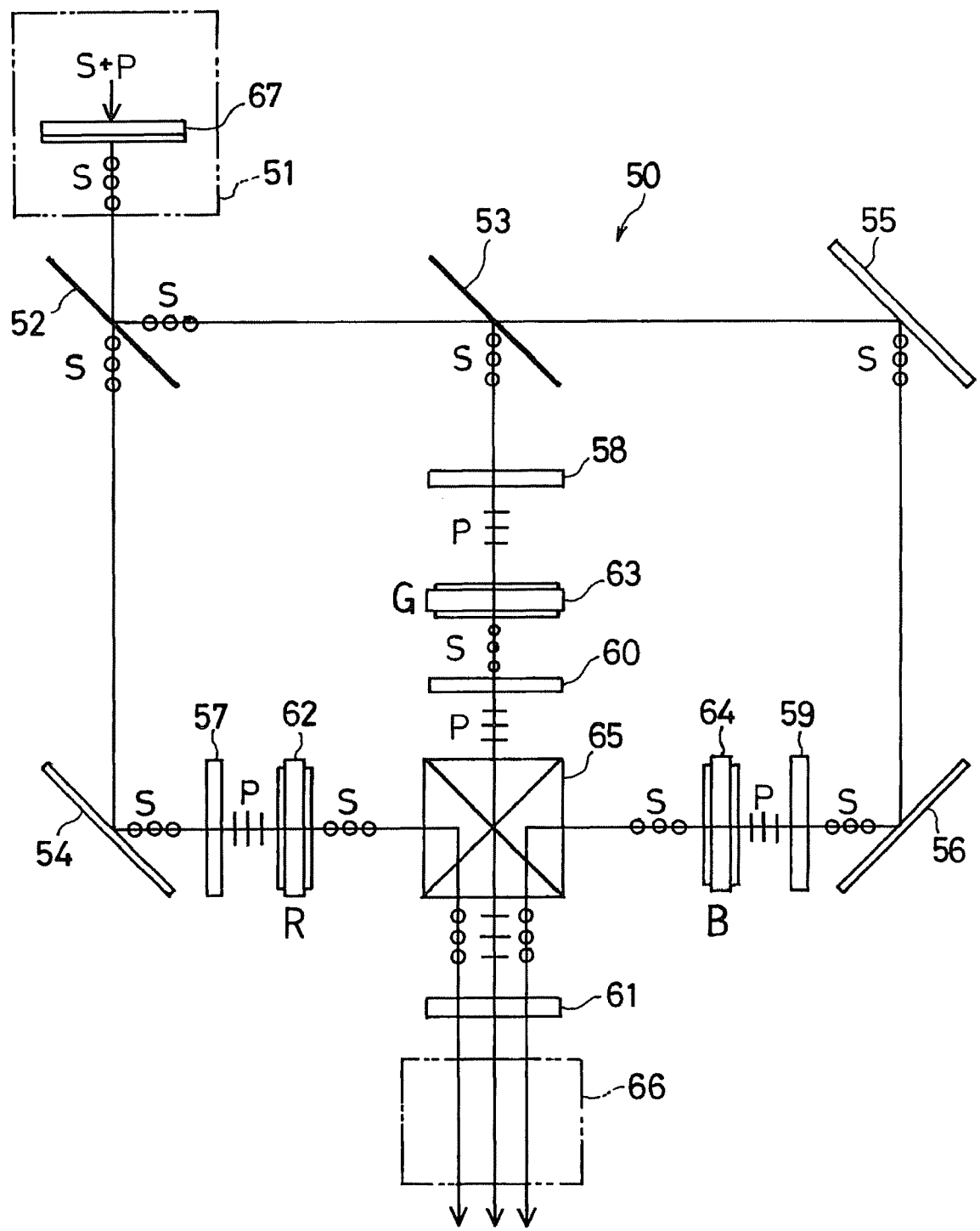
FIG. 15 is a schematic view illustrating a configuration of a projection display apparatus using the laminated half-wave plate according to an embodiment of the invention.
Figure 16A:
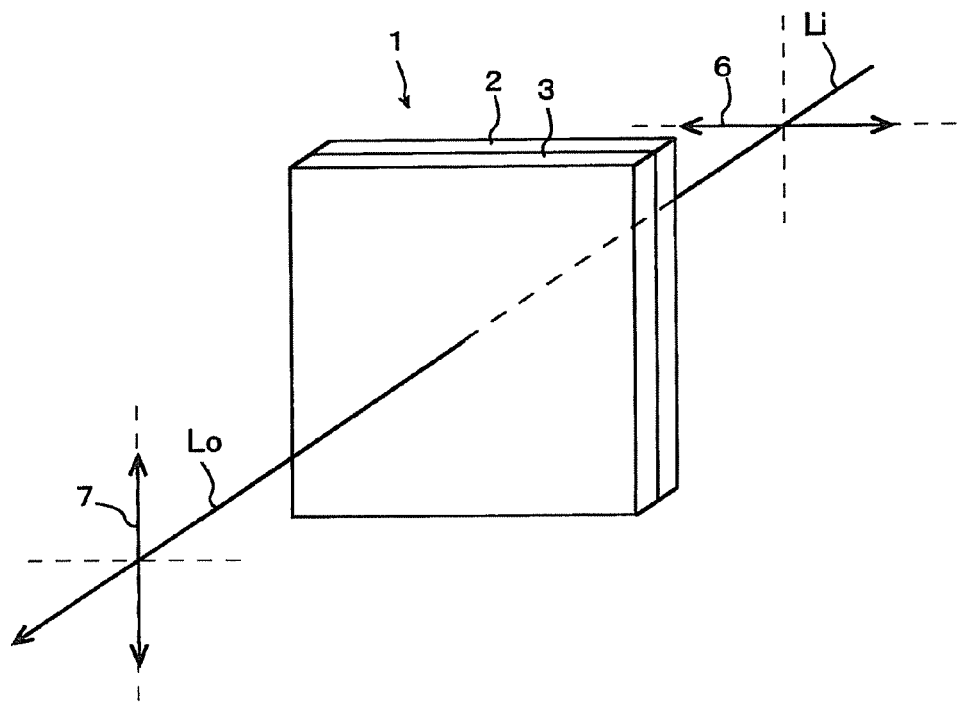
FIG. 16A is a perspective view illustrating a laminated half-wave plate according to the related art as viewed from an output side of light and FIG. 16B is a front view of the laminated half-wave plate as viewed from the output side of light.
Figure 16B:
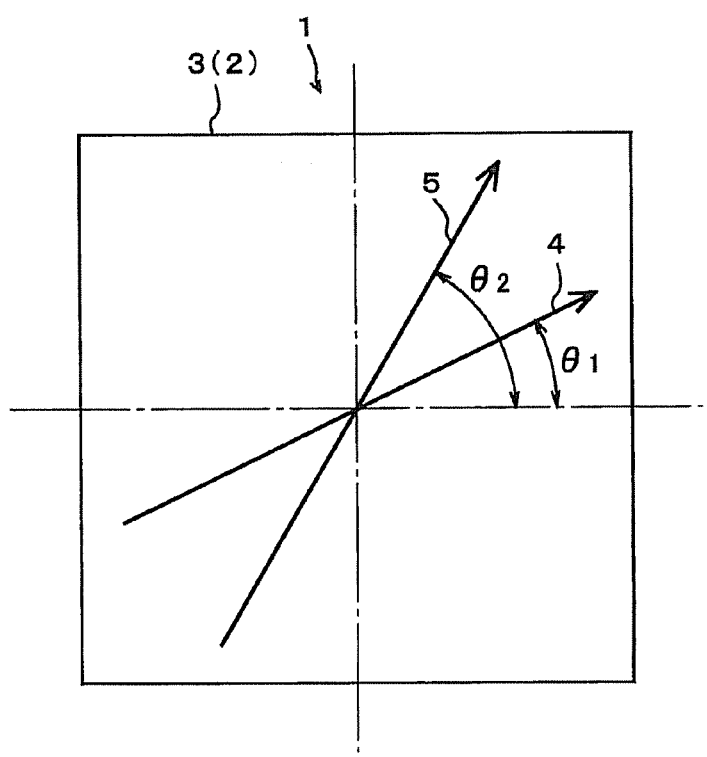

FIG. 15 schematically shows an embodiment of a projection display apparatus which uses the laminated half-wave plate according to the embodiment of the invention. The projection display apparatus 50 is provided with a lighting optical system 51, dichroic mirrors 52 and 53, reflection mirrors 54 to 56, λ/2 wave plates 57 to 61, liquid crystal light valves 62 to 64, a cross dichroic prism 65, and a projection lens system 66. The lighting optical system 51 is provided with a light source for lighting the liquid crystal light valves 62 to 64, a polarization converter 67, a light condensing lens or the like. The polarization converter 67 may employ a polarization converter shown in FIG. 14, and converts and outputs random light from the light source into an S-polarized beam.

In the white light of the S-polarized beam output from the lighting optical system 51, a red light component transmits the dichroic mirror 52 and a blue light component and a green light component are reflected thereon. The red light component transmitted through the dichroic mirror 52 is reflected on the reflection mirror 54, transmitted by the λ/2 wave plate 57 so as to be converted into P-polarized beam, and is incident on the liquid crystal light valve 62 for the red light. The green light component reflected by the dichroic mirror 52 is reflected by the dichroic mirror 53 again, is transmitted by the λ/2 wave plate 58 so as to be converted into P-polarized beam, and is incident on the liquid crystal light valve 63 for the green light. The blue light component reflected by the dichroic mirror 52 is transmitted by the dichroic mirror 53, is reflected by the reflection mirrors 55 and 56, is transmitted by the λ/2 wave plate 59 so as to be converted into P-polarized beam, and is then incident on the liquid crystal light valve 64 for the blue light.

The liquid crystal light valves 62 to 64 are light modulators modulating each color beam on the basis of given image information (image signal) so as to form an image. The cross dichroic prism 65 is a color synthesizer for synthesizing the S-polarized red light and blue light output from the liquid crystal light valves 62 and 64 and the green light converted into the P-polarized beam after being output from the liquid crystal light valve 63 to form a color image. The synthesized light is output to the projection lens system 66 through the λ/2 wave plate 61. The projection lens system 66 is a projection optical system for displaying a color image by projecting the synthesized light onto a projection screen.

In the λ/2 wave plate 61, when the optical axes of the S-polarized beam (red light and blue light) and the P-polarized beam (green light) are determined so as to be changed by 45° in their polarization directions, the S-polarized beam component and the P-polarized beam component of the three colors of light are reduced to about ½. Therefore, the λ/2 wave plate 61 can clearly project a color image onto a polarization screen. Further, instead of the λ/2 wave plate 61, a λ/4 wave plate may be employed. In this case, by converting three color beams of red, green, and blue into elliptically-polarized beams and preferably circularly-polarized beams, the color image can be clearly projected even when a polarization screen is employed as the projection screen.

The laminated half-wave plate according to the embodiment of the invention may be employed in the λ/2 wave plates 57 to 61. Therefore, the projection display apparatus can suppress as much as possible the degradation in conversion efficiency in a wavelength range broader than the related λ/2 wave plate, so that the use efficiency of light can be increased further more. As a result, since a bright color image can be obtained in the same capacity light source or a color image with the same brightness can be obtained even in a light source with a low capacity, power consumption can be reduced.

The invention is not limited to the above-mentioned embodiments, but various modifications or changes can be made within the technical scope. For example, the first and second wavelength plates can be formed of an optical uniaxial crystalline material other than a quartz crystal plate. Further, the invention may be similarly employed for an optical pickup apparatus, a polarization converter, and a projection display apparatus with a configuration different from the above-mentioned embodiments, or for another optical apparatus.

The entire disclosure of Japanese Patent Application No. 2009-081230, filed Mar. 30, 2009 is expressly incorporated by reference herein.

What is claimed is:

1. A half-waveplate comprising:
a first wave plate; and
a second wave plate in which the first wave plate and the second wave plate are arranged so that optical axes thereof intersect each other,
wherein when phase differences of the first wave plate and the second wave plate with respect to a wavelength λ are represented by $\Gamma_1$ and $\Gamma_2$, in-plane bearing angles formed by a polarization plane of a linearly-polarized beam incident on the half-wave plate and optical axes of the first and second wave plates are represented by $\theta_1$ and $\theta_2$, an angle formed by a polarization direction of the linearly-polarized beam incident on the half-wave plate and a polarization direction of the linearly-polarized beam emitted from the half-wave plate is represented by $\phi$, and an optical axis adjustment amount is represented by a, the following expressions are satisfied:

$\Gamma_1 = 180° + n \times 360°$;

$\Gamma_2 = 180° + n \times 360°$ (where $n$ in $\Gamma_1$ and $\Gamma_2$ is a non-negative integer);

$\theta_1 = \phi/4 + a$; and $\theta_2 = 3\phi/4 - a$, wherein the optical axis adjustment amount a is set so that $0° < a < a_{max}$, and the maximum value $a_{max}$ of the optical axis adjustment amount is determined by the following expressions:

$a_{max} = A_0 + A_1 \cdot \phi + A_2 \cdot \phi^2$;

$A_0 = -0.06032$;

$A_1 = 0.0717$; and $A_2 = -0.00035$, or, $a_{max} = A_0 + A_1 \cdot \phi + A_2 \cdot \phi^2$;

$A_0 = -0.15869$;

$A_1 = 0.13912$; and $A_2 = -0.00066$.

2. The half-wave plate according to claim 1, wherein the angle $\phi$ satisfies $15° \leq \phi \leq 90°$.

3. The half-wave plate according to claim 2, wherein n=1 is set in the phase differences $\Gamma_1$ and $_2$ of the first and second wave plates.

4. The half-wave plate according to claim 2, wherein n=2 is set in the phase differences $\Gamma_1$ and $\Gamma_2$ of the first and second wave plates.

5. The half-wave plate according to claim 2, wherein the in-plane bearing angles $\theta_1$ and $\theta_2$ each satisfy $22.5°<\theta_1<45.0°$ and $45.0°<\theta_2<67.5°$.

6. The half-wave plate according to claim 2, wherein the first and second wave plates are formed of a quartz crystal substrate.

7. An optical pickup device comprising:
a light source;
an objective lens focusing a beam emitted from the light source on a recording medium;
a detector detecting the beam reflected from the recording medium; and
the half-wave plate according to claim 2 which is disposed in an optical path between the light source and the objective lens.

8. A polarization converter comprising:
a flat light-transmitting substrate having a first main surface as a beam incidence surface and a second main surface as a beam output surface;
first and second thin optical films disposed in the substrate; and
a wave plate,
wherein the first and second thin optical films are alternately arranged in parallel to be tilted about the first and second main surfaces with a gap therebetween,
wherein the first thin optical film separates a beam input from the first main surface into a first linearly-polarized beam and a second linearly-polarized beam perpendicular to each other, transmits the first linearly-polarized beam, and reflects the second linearly-polarized beam,
wherein the second thin optical film reflects the second linearly-polarized beam reflected by the first thin optical film and emits the reflected second linearly-polarized beam from the second main surface, and
wherein the wave plate is the half-wave plate according to claim 2 which is disposed at a position at which the first or second linearly-polarized beam separated by the first thin optical film is transmitted.

9. The half-wave plate according to claim 1, wherein n=1 is set in the phase differences $\Gamma_1$ and $\Gamma_2$ of the first and second wave plates.

10. The half-wave plate according to claim 1, wherein n=2 is set in the phase differences $\Gamma_1$ and $\Gamma_2$ of the first and second wave plates.

11. The half-wave plate according to claim 1, wherein the in-plane bearing angles $\theta_1$ and $\theta_2$ each satisfy $22.5°<\theta_1<45.0°$ and $45.0°<\theta_2<67.5°$.

12. The half-wave plate according to claim 1, wherein the first and second wave plates are formed of a quartz crystal substrate.

13. An optical pickup device comprising:
a light source;
an objective lens focusing a beam emitted from the light source on a recording medium;
a detector detecting the beam reflected from the recording medium; and
the half-wave plate according to claim 1 which is disposed in an optical path between the light source and the objective lens.

14. A polarization converter comprising:
a flat light-transmitting substrate having a first main surface as a beam incidence surface and a second main surface as a beam output surface;
first and second thin optical films disposed in the substrate; and
a wave plate,
wherein the first and second thin optical films are alternately arranged in parallel to be tilted about the first and second main surfaces with a gap therebetween,
wherein the first thin optical film separates a beam input from the first main surface into a first linearly-polarized beam and a second linearly-polarized beam perpendicular to each other, transmits the first linearly-polarized beam, and reflects the second linearly-polarized beam,
wherein the second thin optical film reflects the second linearly-polarized beam reflected by the first thin optical film and emits the reflected second linearly-polarized beam from the second main surface, and
wherein the wave plate is the half-wave plate according to claim 1 which is disposed at a position at which the first or second linearly-polarized beam separated by the first thin optical film is transmitted.

15. A projection display apparatus comprising:
a light source;
a polarization converter according to claim 14 converting a beam from the light source into the second linearly-polarized beam and emitting the second linearly-polarized beam;
a modulator modulating the beam emitted from the polarization converter on the basis of image information to be projected; and
a projection optical system projecting a beam modulated by the modulator.

16. The projection display apparatus according to claim 15, wherein the modulator is a liquid crystal panel.

* * * * *